INVENTOR.
STANLEY J. GARTNER
BY
ATTORNEYS

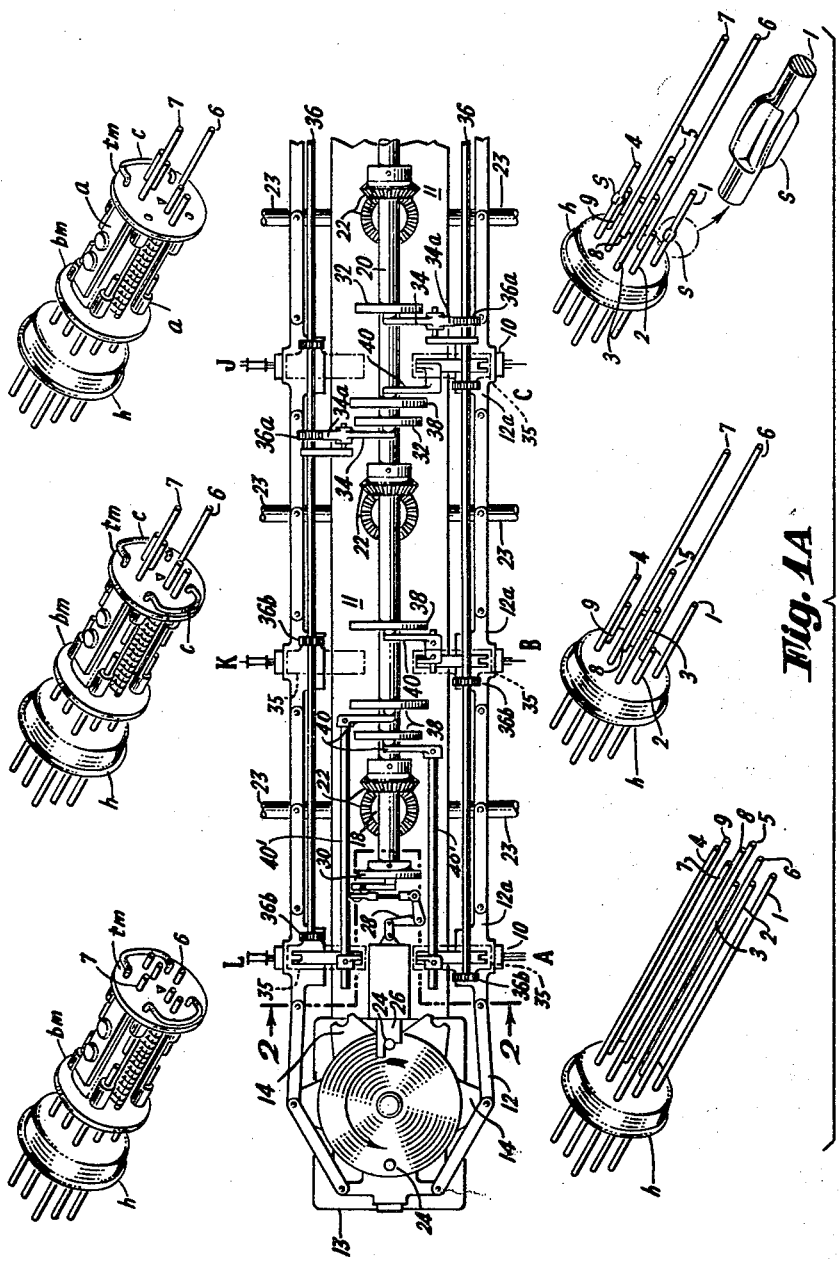

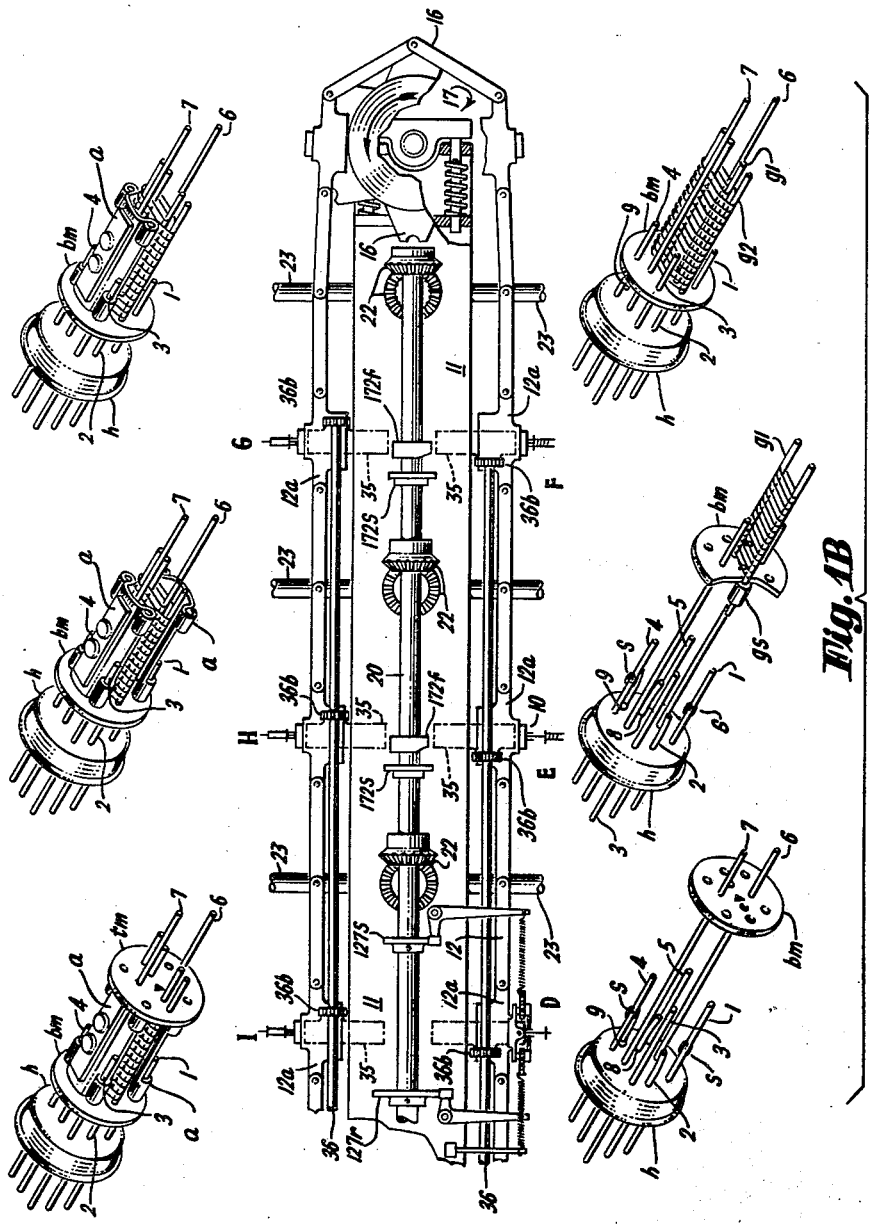

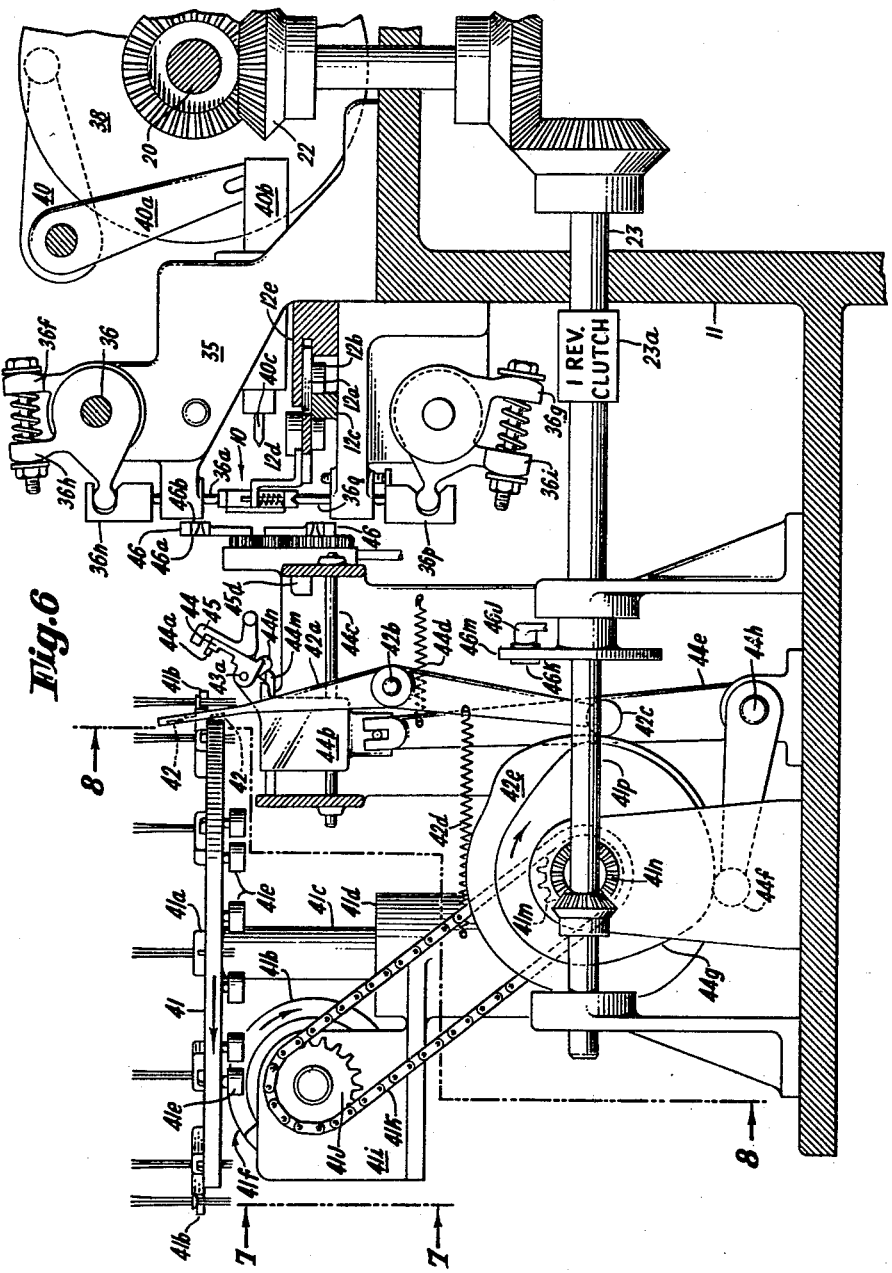

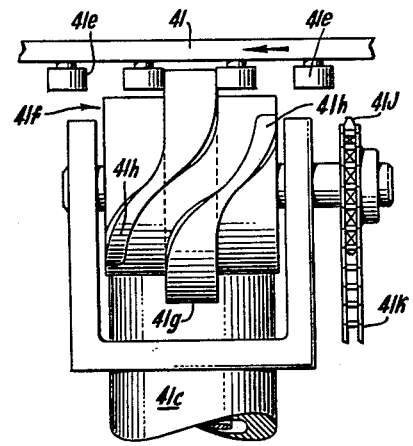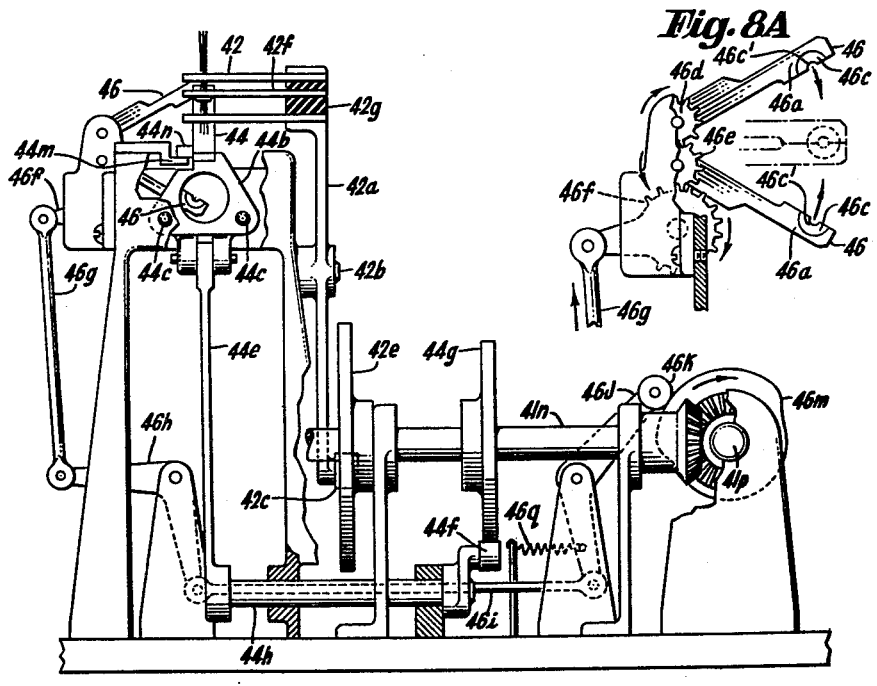

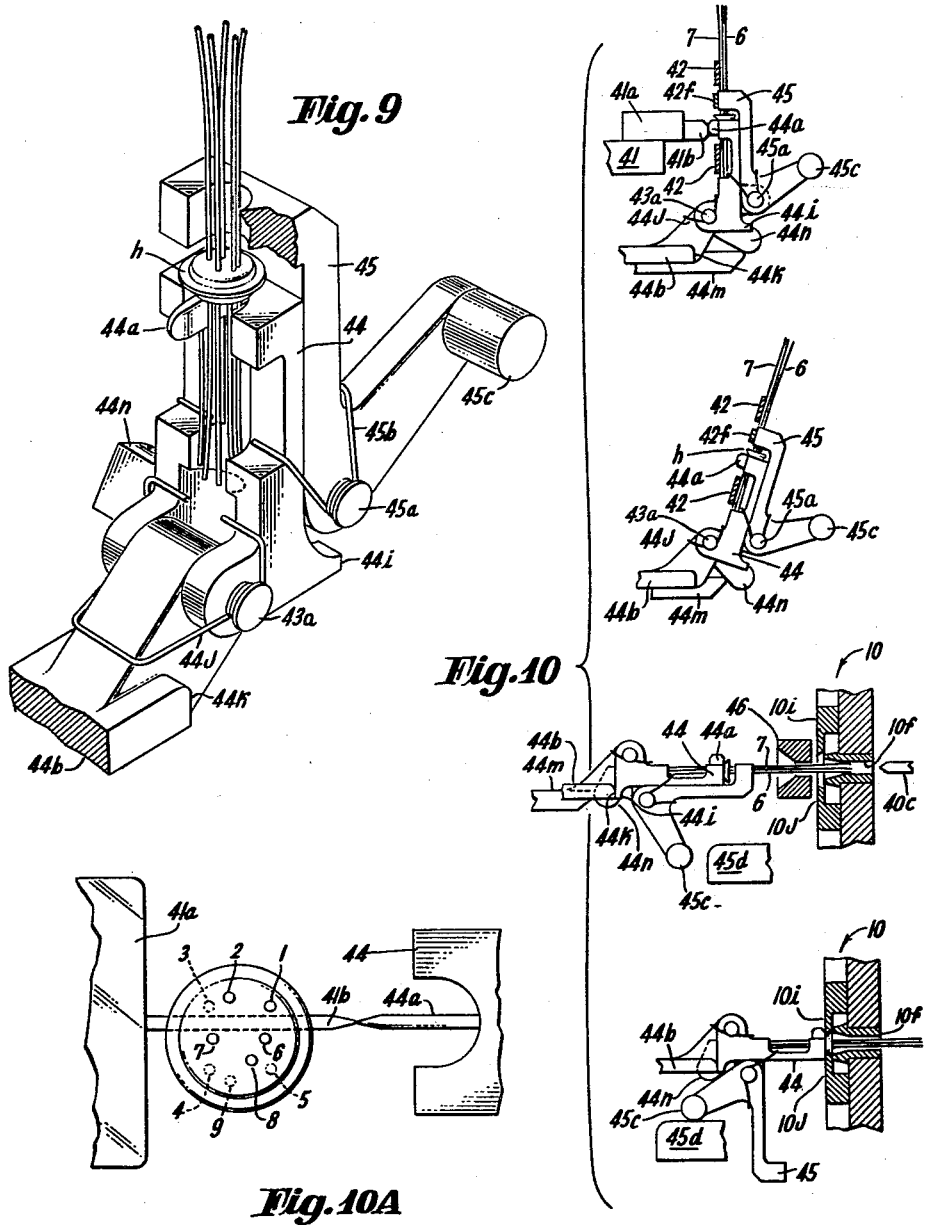

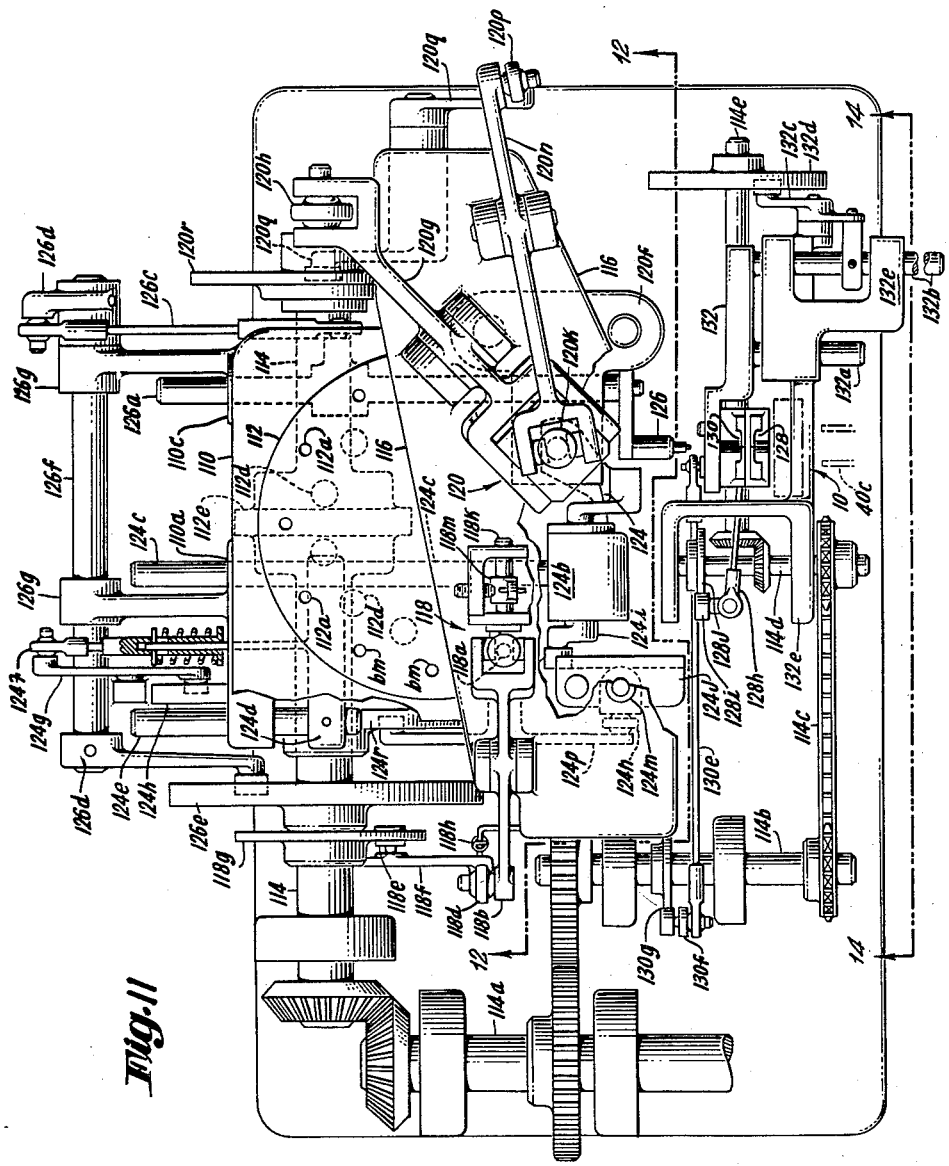

INVENTOR.
STANLEY J. GARTNER

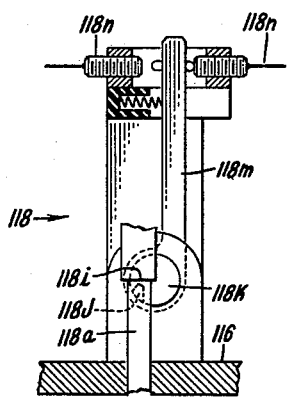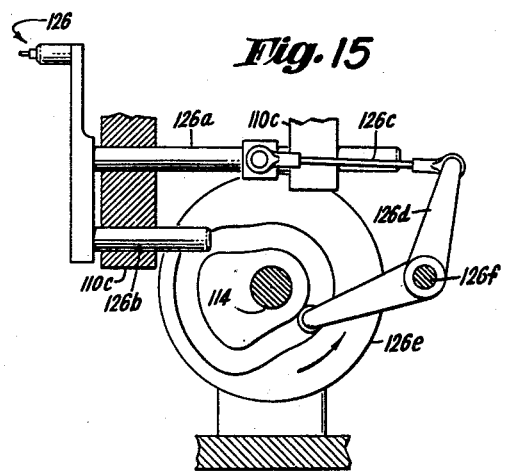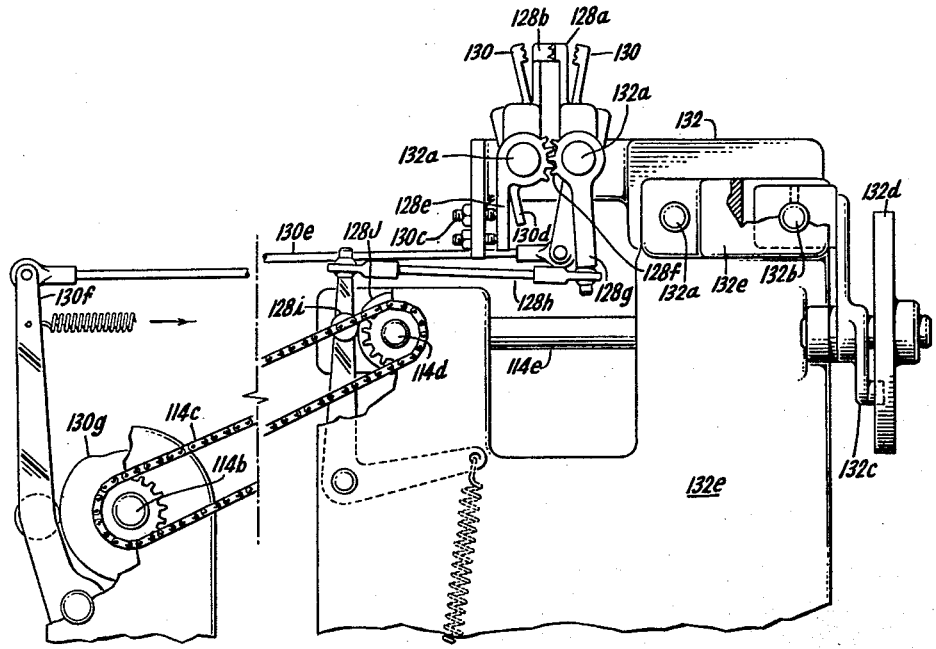

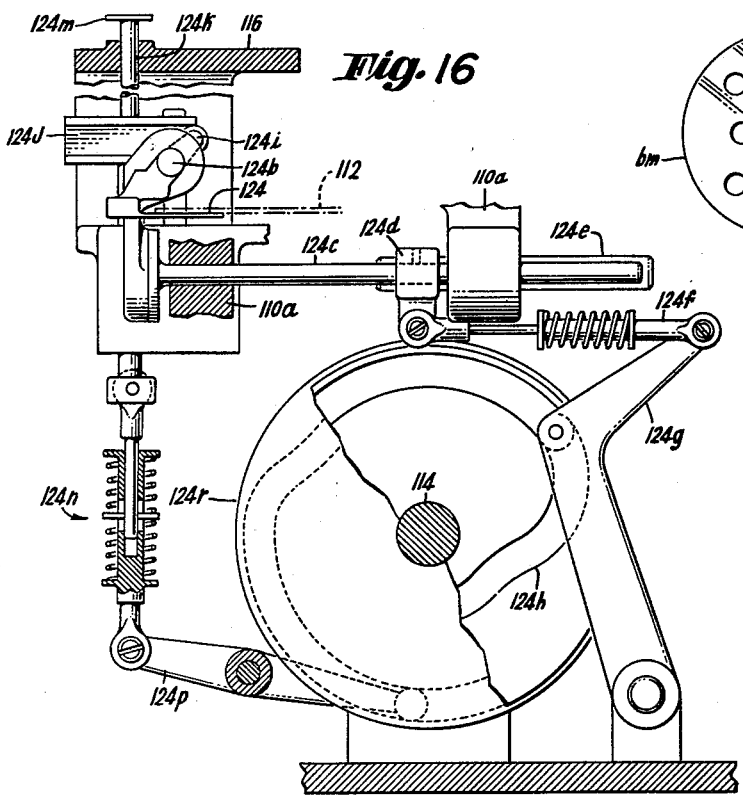
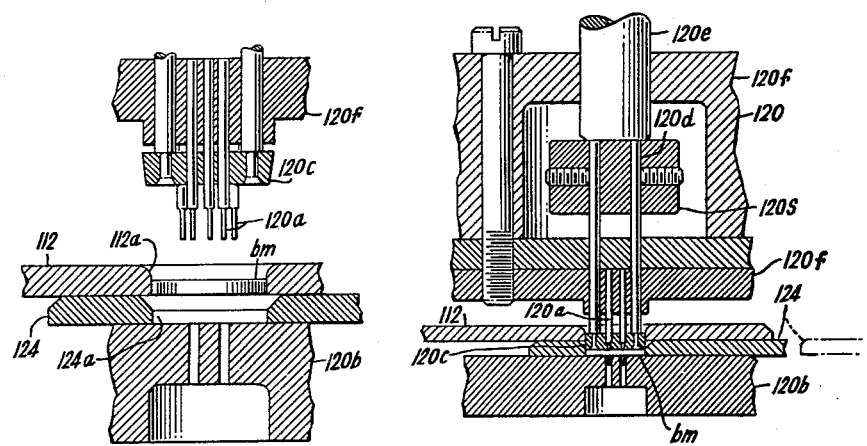
Fig. 16, Fig. 19, Fig. 17, Fig. 18
INVENTOR.
STANLEY J. GARTNER
ATTORNEYS

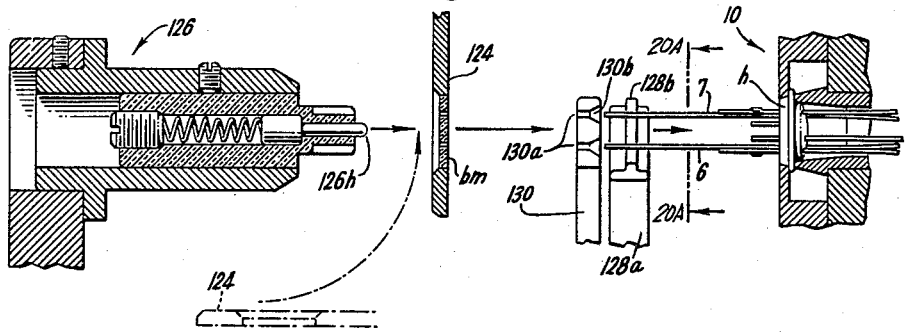
Fig. 20
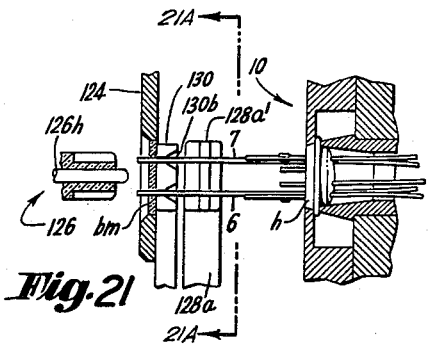
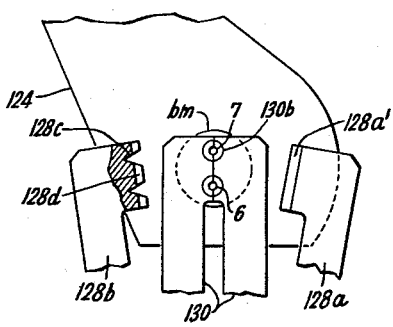
Fig. 20A
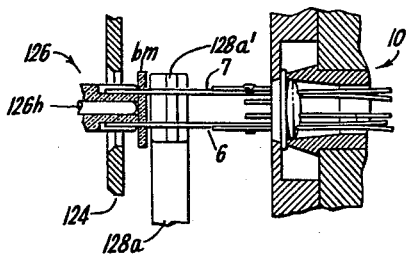
Fig. 21
Fig. 22
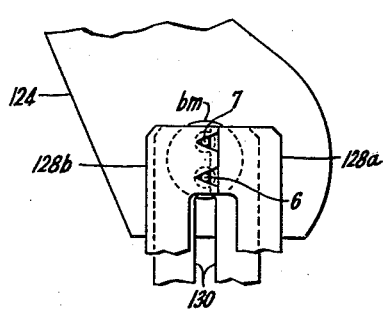
Fig. 21A
INVENTOR.
STANLEY J. GARTNER
BY Amster & Levy
ATTORNEYS

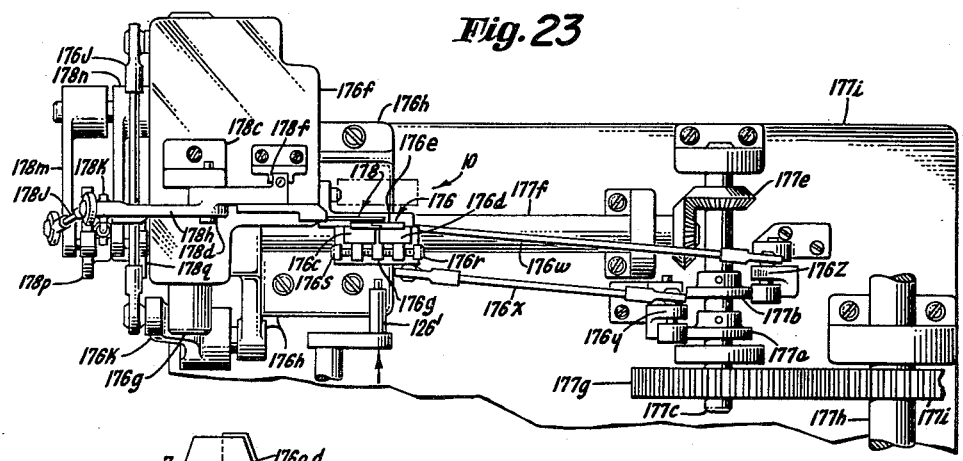
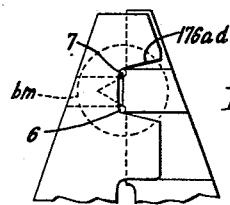
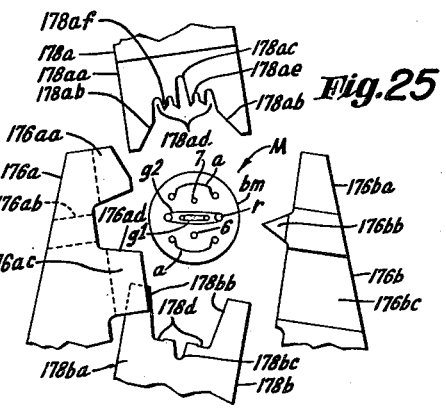
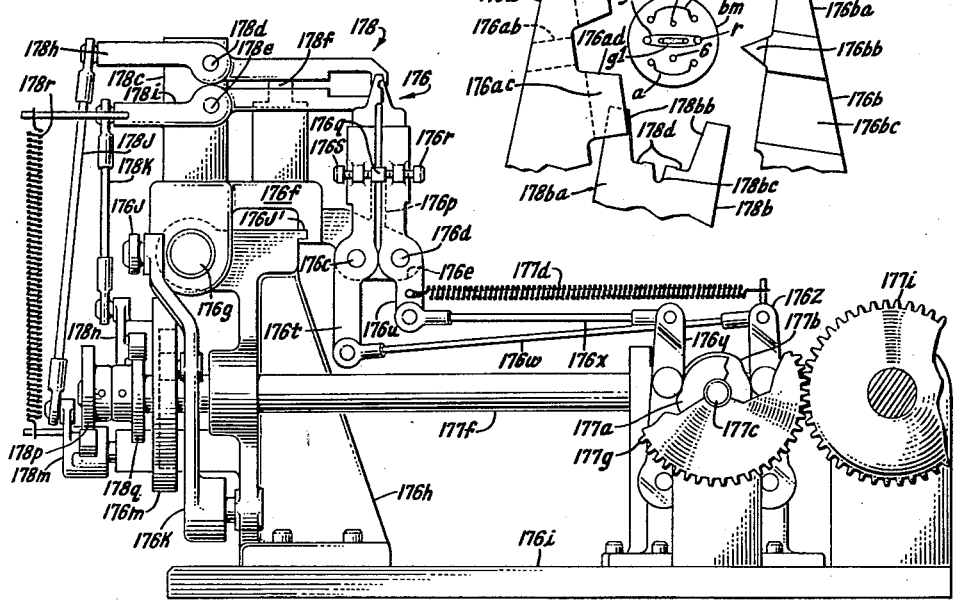
Fig. 23
Fig. 24
Fig. 25
Fig. 26
INVENTOR.
STANLEY J. GARTNER
BY
ATTORNEYS

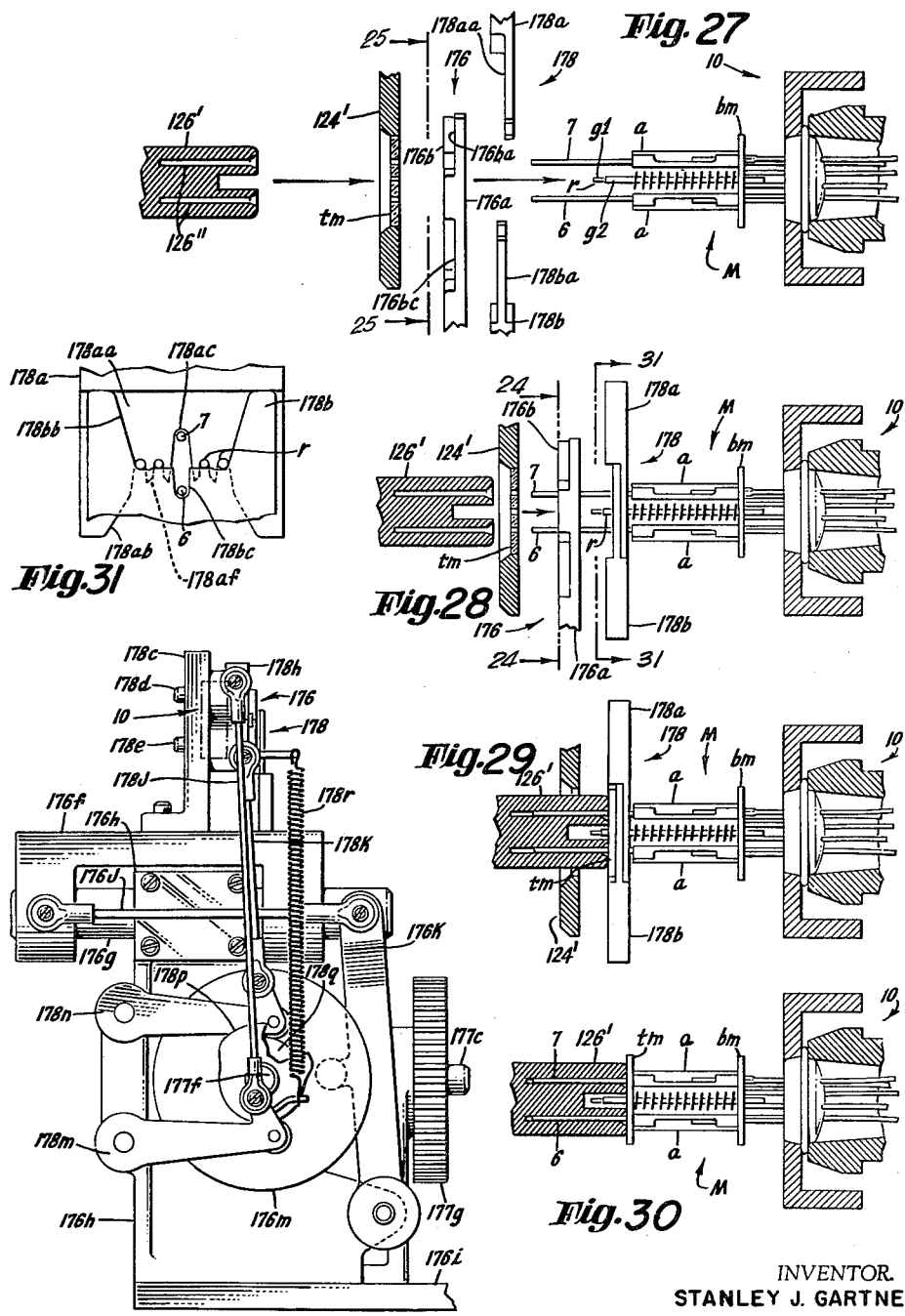

INVENTOR.
STANLEY J. GARTNER
BY

ATTORNEYS 3,192,601
PIERCING AND ASSEMBLING MECHANISM FOR ASSEMBLING APPARATUS AND METHODS
Stanley J. Gartner, Emporium, Pa., assignor, by mesne assignments, to Sylvania Electric Products Inc., Wilmington, Del., a corporation of Delaware
Application Feb. 7, 1962, Ser. No. 171,745, which is a division of application Ser. No. 406,930, Jan. 29, 1954, now Patent No. 3,069,749, dated Dec. 25, 1962. Divided and this application Sept. 19, 1963, Ser. No. 309,938
16 Claims. (Cl. 29—25.2)

The present invention relates generally to piercing and assembling mechanisms used in connection with methods and apparatus for automatically assembling parts, particularly the component parts of a mount or electrode assembly of an electronic tube or the like. This application is a division of application Serial No. 171,745, filed February 7, 1962 which is a division of application Serial No. 406,930, now U.S. Patent No. 3,069,749 of December 25, 1962.

During the several decades of technical development and commercial exploitation of vacuum tubes and the like there has been a persistent need for improved methods of assembly and for automatic assembling apparatus for the electrodes of such devices. Some early machines were devised that were adapted to assemble simple types of mounts but even these were unsuccessful to my knowledge.

For many years, tubes have included many electrodes, and with the development of the hearing aid and the proximity fuze, the dimensions of many types of tubes have been greatly reduced. It will be recognized that as mounts are made progressively smaller, manual assembly without deforming the delicate electrodes becomes progressively more difficult. In the event that a mount is assembled imperfectly, perhaps including a deformed electrode, the defective nature of the mount may not be detected until after the mount is sealed in its envelope as finally exhausted and completed. At this stage, it is revealed as defective after it represents a far greater expenditure than is represented by the mount itself. In other words, manual assembly techniques tend to deform the electrodes in such a way that defective mounts are often detected after the tube construction has advanced to an expensive stage. The methods and apparatus provided by the present invention vastly reduce this tendency to deform electrodes; and any deformation produced occasionally is so prominent as to be immediately detected and the mount can be rejected while still representing comparatively small cost.

It is accordingly an important object of the present invention to provide new and improved methods and apparatus for automatically assembling electronic tube mounts and the like. A further object is to automatically assemble electrodes of even small and complicated mounts in rapid, precise and automatic routine.

In the illustrative embodiment of the invention detailed below, the electrodes are assembled in proper mutual relationship. The mount as finished in the disclosed embodiment includes a "stem" on which the electrode assembly is supported, the stem consisting of a glass button or header through which are sealed a set of wires. These serve as terminal connectors and mechanical supports of the electrodes later assembled on the wires. The header usually serves as the end of a tube envelope.

Stems are ordinarily prepared in molding machines which locate the wires in the glass header with relatively broad tolerance. A feature of the present invention is in the "tailoring" or trimming of the leads to accurately determined lengths; and a further feature is in the adjustment of the lead positions to close tolerance, for consistent and reliable operation of the assembling machine and further to assure consistent, accurate duplication of the automatically assembled mounts. In accomplishing this purpose, the machine handles the stems and is effective to adjust the way in which the stems are held so as to perfect the positioning of the wires; and that effect is further enhanced by devices which trim certain of the wires to critical lengths spaced from the glass portion and to bend certain of the wires, where necessary, into the optimum pattern on which the remainder of the operations depend.

The machine includes a conveyor which carries a number of work holders from each of a series of stations to the next, step-wise. Because of the small dimensions of the illustrative mount being assembled and the consequent close tolerances involved, it is important that the conveyor should consistently advance the work holders to an accurate position in each station. Ordinary conveyor mechanisms, such as the usual chain conveyor, tend to introduce slack and in this way tend to defeat the objective of accurate transport of the work holders. A feature of this invention resides in a conveyor having unusually large links, and correspondingly, having relatively few links. A subsidiary feature relates to the conveyor that is disposed about a pair of sprockets, one of which is movable to and from the other so as to accommodate the travel of the large links about those sprockets. The use of an odd number of links minimizes the motion of the movable sprocket, and the consequent impacts on the frame and in the drive are minimized.

In the illustrative machine, the previously molded glass-and-wire stems are loaded manually onto a conveyor plate with rough preliminary orientation. A feature of the invention resides in the techniques and mechanisms for handling the glass-and-wire stem during its transfer from the initial feed plate to the work holders of the main conveyor, so as to preserve and improve the initial orientation and to effect this transfer in a simple manner well suited to specialized forms of stems.

The completed mount in this illustrative disclosure involves parallel insulated discs, customarily of pierced mica, which fix the spacing between the electrodes precisely. As previously mentioned, the wires of the stem are adjusted in the machine, into an accurate pattern. In this illustrative machine an important feature is in the provision of a piercing die for forming the holes in the mica while each mica is held in the very element utilized to transfer and apply the mica to stem wires, and in the case of the top mica, to certain of the electrodes.

That portion of the machine which locates the stem in the work-holder and trims the wires to critical lengths constitutes a useful combination; but if the machine accomplished no more, it might well be considered uneconomical. Ordinarily, stems are manually inserted into a trimming die. An important feature of this invention is in not merely trimming the stem leads, but accomplishing the further mount-assembly operations on the stem as trimmed and oriented in the trimming operation. The consistent orientation of the stems and the consistent trimming of the leads at a uniform distance from the workholder establishes a uniform condition of the stem utilized in assembly of the additional parts, with consistent accuracy and success.

The first mica to be assembled has an accurate pattern of pierced holes. Certain stem wires enter certain of the pierced holes in the mica when the mica is assembled to the stem. Those wires are then engaged and utilized in subsequent assembling operations, to pick up and accurately locate the mica so that electrodes may automatically be assembled to the mica, with portions of those electrodes extending through additional pierced holes in the mica. The mica is oriented indirectly.

A further feature of the present invention resides in the insertion of the side rods of the usual helically wound grid into holes pierced in a mica after the mica is on the stem wires. This is accomplished by applying the mica to the stem wires at an intermediate position, by supplying and to supply thrust-resisting backing for the mica while inserting the grid, and finally by pushing the grid and mica all the way to the short wires on the stem. A further feature resides in the welding of a grid stop to one of the grid side rods so as to prevent appreciable shifting of the grid in the completed tube, and to accomplish this despite extremely small dimensions involved in the illustrative mount to which the invention is applied. This is accomplished when the mica is at an intermediate position (such that both sides of the mica are easily accessible) and after grid insertion. The stop is applied to the grid side rod with the mica in this position, and thereafter the mica and grid subassembly is advanced to its final position on the stem wires. The welding tools serve not only to weld, but to transport the grid stop to position and to furnish thrust resistance behind the mica during insertion of the grid.

A further feature of the invention resides in the assembly of a second grid telescopically about the first while the first mica is in the intermediate position and with the side rods of the second grid penetrating the prepared holes in the mica, and thereafter advancing the subassembly of two grids and the mica to the final position on the wires of the stem.

In the illustrative disclosure, it will be seen that the two grids function with two long stem wires as electrodes of a pentode; and a two-part anode in the form of two preformed anode plates is automatically assembled to the mount thus far completed.

In this machine, a second mica is applied to the projecting ends of the electrodes opposite the first mica; and a further part is assembled to the mount to lock the mica in place and to interconnect the parts of a two-part anode. One of those electrodes that penetrates the top mica is seized and oriented for indirectly orienting the top mica in this assembling operation, a feature that is found in another form in the grid-mounting stations.

A desirable minimum number of welding operations is effected for permanently retaining the assembly of the electrodes and other parts in the initial accurate configuration produced by the uniformly repeated operations of the machine.

Included in several stations are various important forms of tools which, like the gathering tools in the cutting station, embrace the parts of the partial mount while a further component is advanced into place. An especially useful and novel form of gathering tool used in combination with assembling mechanisms in several of the stations involves jaws which close on each other and, when closed, present a pattern of apertures with flared openings facing the stem holder. They advance on and receive the stem wires, and having established orientation desired for an assembly operation, are laterally separated and withdrawn. Cerain split tools have flared openings facing toward the stem and flared openings facing away from the stem. These advance on the stem to receive and orient a pattern of wires while also acting to direct a further part, such as a grid or an anode part, in a precise path toward the partial mount. These and further detailed yet important features of the invention will be better appreciated from the specific description of the various tools involved.

In the event of misoperation, it may happen that a mount is deformed by the apparatus. Such deformed mount is prominently defective and is readily detected upon inspection and rejected as it emerges from the machine, long before it can reach the envelope sealing and evacuating stage of manufacture of electron tubes. This is a valuable aspect of the invention. The mount as it emerges at the assembling stage of tube manufacture can be rejected at low cost if it should be found defective. In contrast, manually assembled mounts with no prominent visual defect are assembled into completed, sealed and exhausted tubes, and at this completed stage there is a very substantial rate of rejection. The rate of rejection of completed tubes containing mounts prepared under the present invention is sharply reduced.

Further features of novelty will be appreciated from the illustrative disclosure that follows. It will naturally be understood that certain aspects and features of the described embodiment may be omitted as required and that certain features are useful in other combinations. However, the entire organization is admirably adapted to achieve the broad purpose of assembling and uniting the electrodes of a mount, particularly in assembling numerous electrodes of a subminiature mount. In the detailed disclosure, reference is made to the accompanying drawings forming part of the present disclosure. In the drawings:

FIGS. 1A and 1B are a plan view of an illustrative mount machine embodying features of the present invention, including the work conveyor and portions of the coordinating drive and cam mechanisms of the various work stations, showing in greatly enlarged perspective the progress of a typical mount during passage through the several work stations of the machine but omitting those stations;

FIG. 6 is an elevation, certain parts sectioned and broken away, showing portions of the mechanism of FIG. 1A together with the stem-loading mechanism at Station A of FIG. 1A;

FIG. 7 is an enlarged fragmentary elevation, viewed generally from the line 7—7 of FIG. 6 and looking in the direction of the arrows, showing the turret indexing mechanism;

FIG. 8 is an elevation, with some parts broken away and shown in section, taken substantially along the line 8—8 of FIG. 6 and looking in the direction of the arrows, showing the details of transfer fingers for displacing successive stems from the feed turret onto a two part transfer member;

FIG. 8A is an elevation showing the details of a split funnel guide interposed between the transfer member and the stem block in FIG. 6;

FIG. 9 is a perspective view showing the details of the two part transfer member of FIG. 6 with a stem loaded therein ready for transfer;

FIG. 10 is a four stage progressive illustration of the transfer member of FIG. 6 in successive positions of movement from receiving a stem at the feed turret to delivering the stem through the split guide to the stem block;

FIG. 10A is an enlarged fragmentary plan view showing a stem on the feed turret together with part of the transfer member, as viewed just prior to the first diagrammatic showing of FIG. 10;

FIG. 11 is a plan view, with parts broken away, showing the general arrangement and operating mechanisms at the bottom mica applying station D of FIG. 1B;

FIG. 13 is a fragmentary view in section taken substantially along the line 13—13 of FIG. 12 and looking in the direction of the arrows showing portions of the mica-thickness detecting mechanisms;

FIG. 14 is a fragmentary elevation partly in section taken substantially along the line 14—14 of FIG. 11 and looking in the direction of the arrows, with parts broken away;

FIG. 15 is a fragmentary elevation of part of the mechanism in FIGS. 11 and 12 showing pusher unit and operating mechanism for displacing a bottom mica from the transfer member;

FIG. 16 is an elevational view of part of the mechanism in FIGS. 11 and 12 with parts broken away and sectioned, showing the details of the mica transfer mechanism;

FIG. 17 is an enlarged cross-sectional elevation, this view showing the details of the mica-piercing punches forming part of the mechanism in FIGS. 11 and 12 and their relative position with respect to the mica-transfer member, the male die being shown in retracted position prior to mica piercing;

FIG. 18 is a view similar to FIG. 17 showing the mica after being transferred into the transfer blade and during piercing by the punch;

FIG. 19 is a greatly enlarged plan view of a pierced mica;

FIG. 20 is an enlarged fragmentary view of portions of the mechanism in FIGS. 11 and 12, with a transfer blade shown in solid lines in one position and in broken lines in another position;

FIG. 20A is an elevational view taken along the line 20A—20A of FIG. 20 and looking in the direction of the arrows showing the preliminary gathering and combing tools separated and with the fine gathering or combing tools in closed position;

FIG. 21 is a view similar to FIG. 20 showing the cycle advanced to the point where the transfer member applies a mica over the oriented leads, the respective sets of combing and gathering tools being displaced toward the stem block;

FIG. 21A is a view similar to FIG. 20A taken along the line 21A—21A in FIG. 21 showing the preliminary orienting tools in the closed position;

Figure 22A:
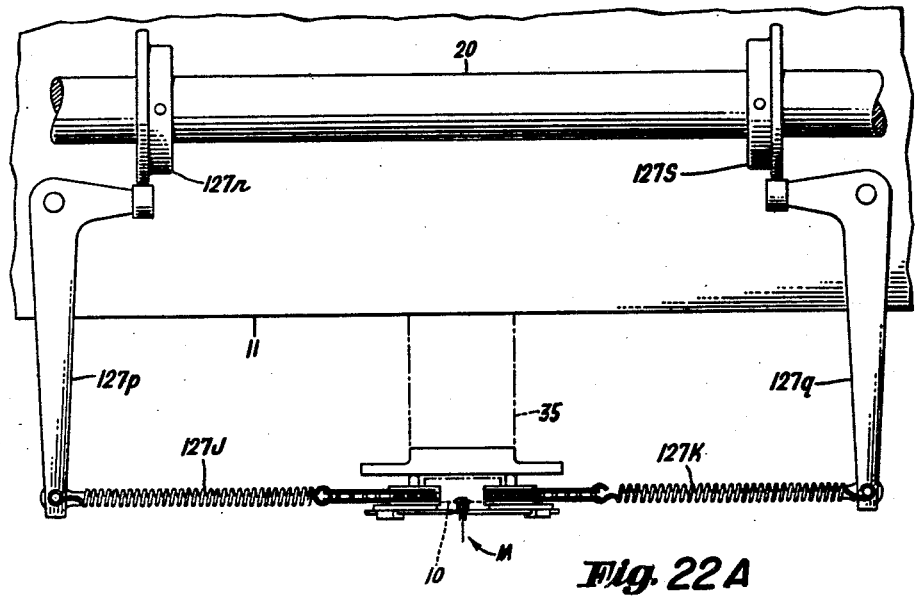
FIG. 22 is a view similar to FIG. 21 but at the end of the mica applying stroke and showing a set of combing and gathering tools removed, with the mica pusher having freed the mica from the transfer member.
Figure 22B:
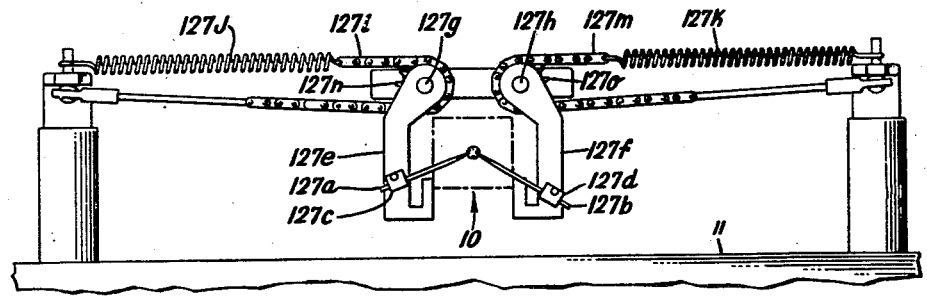
Figure 22C:
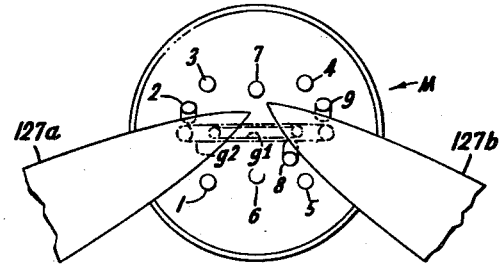

FIGS. 22A, 22B, 22C show a mechanism adjacent station D in FIG. 1B for bending short-length leads of the stem where necessary to permit unimpeded insertion of grid side-rods, wherein FIG. 22A is a plan view of the mechanism, FIG. 22B is an elevational view of FIG. 21, and FIG. 22C is a greatly enlarged elevation showing parts of the tools of the clearance mechanism engaged between leads of the mount, the desired ultimate grid positions being represented by the dot-dash lines;

FIG. 23 is a fragmentary plan view showing portions of the mechanism of the top mica-applying station I of FIG. 1B;

FIG. 24 is an enlarged fragmentary elevation viewed from the line 24—24 of FIG. 28, showing the details of one set of gathering jaws at top mica station I;

FIG. 25 is an enlarged elevation viewed from the line 25—25 of FIG. 27 showing the set of gathering tools of FIG. 24 in open position, and showing an additional set of gathering tools at the top mica station;

FIG. 26 is an elevation of the mechanism in FIG. 23 omitting the pusher unit 126';

FIG. 27 is an enlarged plan view of the tools in the top mica station I, together with a stem block carrying a partially completed mount having two anode parts, two concentric grids and a bottom mica assembled on a stem;

FIGS. 28, 29 and 30 are progressive enlarged plan views similar to FIG. 27 at successive times later in the top mica applying cycle, FIG. 31 is an enlarged fragmentary elevation looking from the line 31—31 of FIG. 28 in the direction of the arrows;

FIG. 32 is an elevation of the mechanism as seen from the left in FIG. 26.

Figure 33:
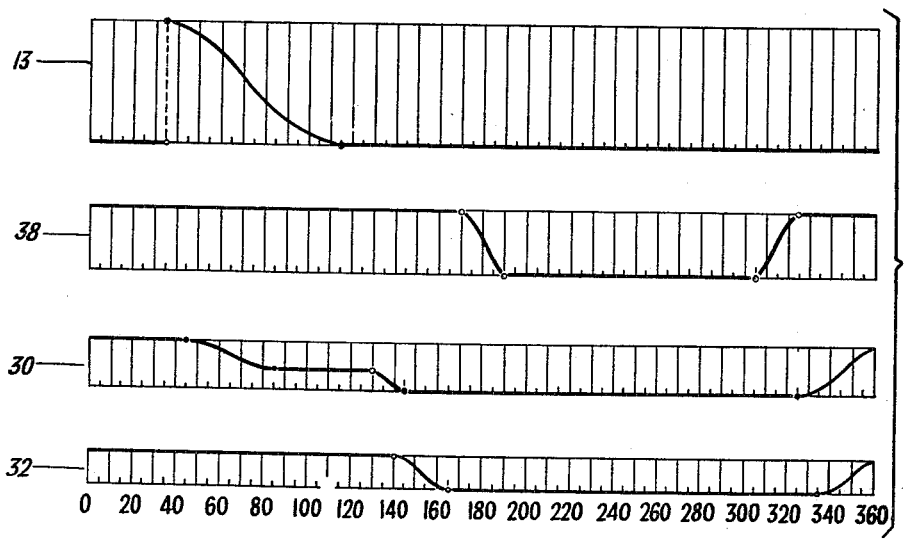
Figure 34:
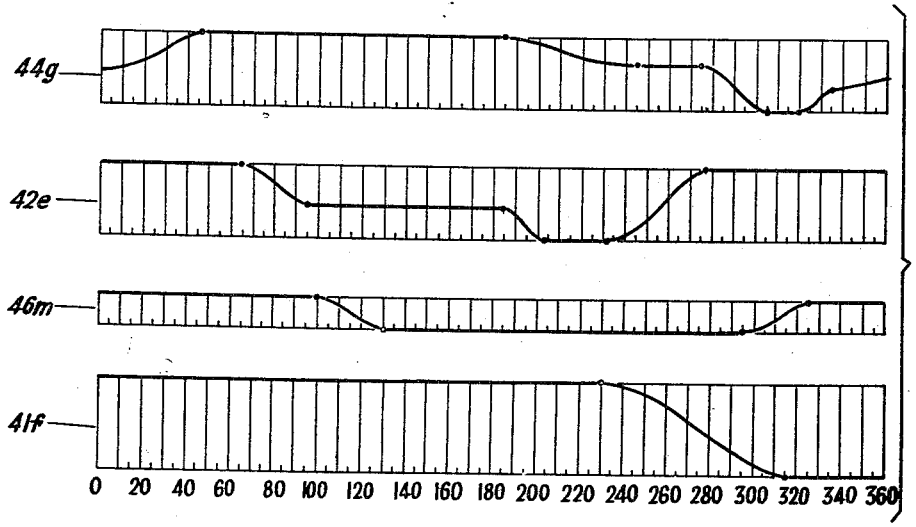
Figure 35:
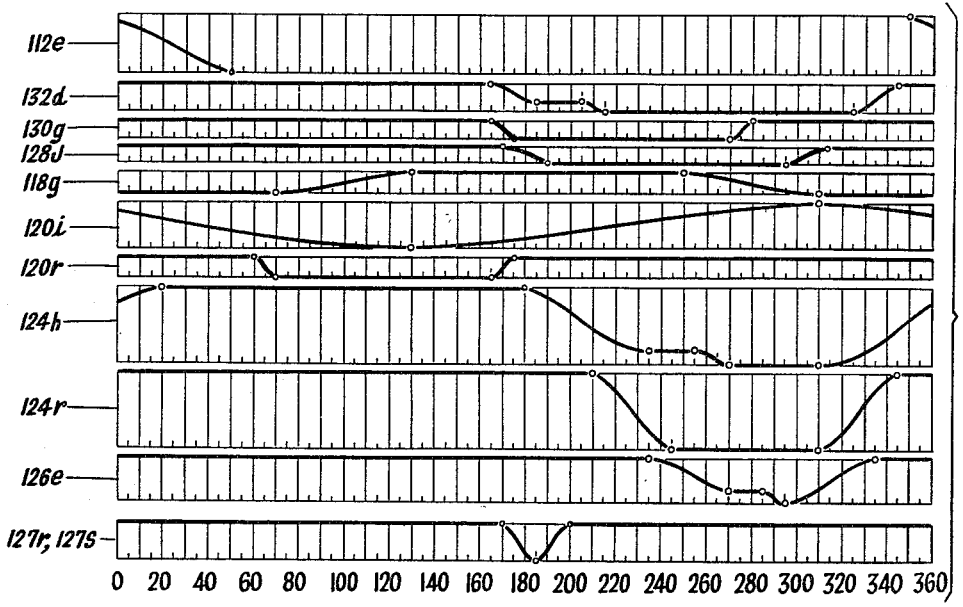
Figure 36:
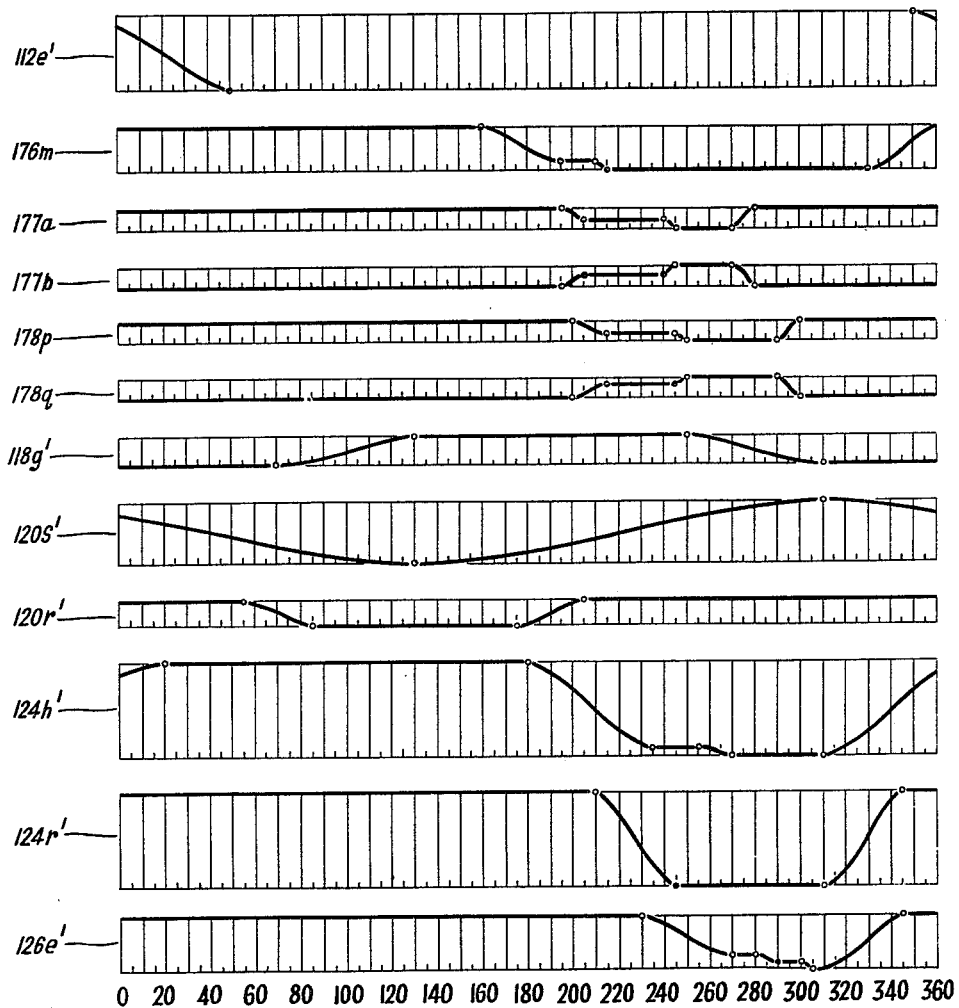

FIG. 33 is the timing chart of the conveyor and stem-block operating mechanism of FIGS. 1A and 1B;

FIGS. 34–36 are, respectively, the timing charts of the mechanism in stations A, D and I designated in FIGS. 1A and 1B.

In FIGS. 1A and 1B there is shown the plan view of a conveyor 12 and associated operating mechanisms for assembling a number of electrodes to a stem made up of wires sealed in a glass header $h$. The assembly of the electrodes and the stem is termed a "mount" in the art. Such an assembly may be of various sizes, and the principles here involved will be recognized as applicable to a wide range of designs of mounts and the like. However, the present machine is particularly adapted, by the solution of numerous special problems, to the assembly of mounts of extremely small proportions. The tube used in this illustrative embodiment is a pentode having a two-part anode, a wire or rod suppressor, a screen grid, and a control grid, all of which extend parallel to the length of the tube and are fixed in relative spacing each from the others by an insulating wafer at each end of the electrode assemblies, usually of mica. The particular tube is intended to receive a filamentary cathode that is manually added to the mount after the mount is delivered by this assembling machine. The diameter of the tube being fabricated is the so-called "T-3" size, that is, approximately ⅜" outside diameter of the glass enclosing envelope.

The tube is assembled by commencing with a stem or header that is loaded into a conveyor and is transported step-wise past a series of operating stations A to L inclusive where the header wires are either shaped by cutting and swaging or where one or more of the electrodes and the micas are assembled or welded to produce the completed mount. The extremely small dimensions of the mount being assembled represent a controlling consideration throughout the machine. Thus, the machine itself forms certain of the mount parts in accurate configuration so that the part will be in perfect orientation for assembling and so that, when the sub-assembly leaving one station reaches a succeeding station, the various parts of the sub-assembly will be in accurate position and relative arrangement for the operation at the succeeding station.

In FIG. 1A three stations, A, B, and C are seen where a stem block 10 on the linked conveyor 12 comes to rest successively. At the first station A, glass header $h$ having sealed wires 1 to 9 inclusive, is mechanically loaded on the conveyor in proper position for the further operations in the succeeding stations B and C. Wires 1, 2, 3, 4, . . . 8, 9, extend from the wafer header $h$ in particular positions appropriate for succeeding operations which are effected at further stations during the travel of the conveyor between the stem-loading and unloading positions A and L.

By loading the stem into the machine with the wires 1 to 9 inclusive of equal length and longer than the longest wire needed, it becomes possible to trim the wires to lengths required during further assembly operations, all accurately in relation to a common reference, namely, the wafe header $h$. In the final part of the conveyor's traverse, there is seen a mount completed by this machine. This includes a bottom mica $bm$ spaced accurately from the header h. The location of the bottom mica bm is established partly by the wires 2, 8 and 9 cut short and having their ends defining a plane against which the bottom mica is pressed. Additionally, leads 1 and 4 (which extend through the bottom mica bm for connection to the two anode plates) have swaged abutments at the plane of cut leads 2, 8 and 9 for supporting the bottom mica bm.

By loading an uncut and unswaged stem into the stem loading station A, it becomes possible to cut certain leads to critical lengths at a further station, and at a still further station to swage accurately located shoulders on certain leads, thereby defining the bottom mica plane. This may be accomplished with the assurance that, although the trimming and swaging are effected at different stations, the operations are consistently related to each other by the accurate orientation of the stem at each of the stations, both as to the end-wise positioning of the wire and as to the wire pattern presented at each station to the operating tools.

Wires 6 and 7 ultimately serve as suppressor electrodes, and are also utilized to support and connect the filamentary cathode. At the cutting or trimming station B, leads 6 and 7 remain uncut and are of the same full length as when received in the stem loading station A; but two other sets of leads are trimmed to different lengths, specifically leads 2, 8, and 9, are trimmed to very short lengths equal to the spacing between the glass header h and the bottom mica bm, and leads 1, 3, 4, and 5 disposed in an approximately square pattern, are trimmed to a medium length such as to penetrate the bottom mica bm and extend part way toward the top mica tm.

In station C, two of the medium length leads namely 1 and 4, are swaged to provide a shoulder or abutment at the same separation from the header h as the ends of wires 2, 8, and 9. The position of the swaged shoulders S and the cut ends of the wires 2, 8, 9 are all of a high order of accuracy because of the accurate grip of header h in a stem holder and the holder is located precisely at each station in the machine. It is an important feature that the header h is seated in its holder and is maintained in a very definite fixed plane in its traverse through the machine from station to station, and further that each of the wires, 1 to 9 inclusive, remains in a very accurately established position endwise and transversely. It will be seen that in some of the stations the accuracy of the positioning of these wires and their pattern is reestablished and carefully readjusted.

It will be understood that the header h as formed in a stem molding machine carries the wires 1 to 9 in a pattern whose accuracy and consistency is limited, considering the requirement of stem molding dies that the wires should be loosely received; and because automatic assembling of a mount must not be impeded by variations in the pattern or distribution of the wires, stations A, B and C of the present machines are adapted to receive wire patterns of coarse tolerance and adjust the pattern of wires to close tolerance, before other parts are assembled.

In station D, the bottom mica bm is applied to wires 6 and 7 and pushed part way down the lengths of these wires but not to the final position where it is pierced by medium length wires 1, 3, 4 and 5 and rests against the ends of short wires 2, 8 and 9, and the swaged shoulders S of the wires 1 and 4.

At the bottom mica-applying station D (see FIG. 1B) an important principle of the machine is utilized further and again illustrated. The accurately oriented wires whose positions are fixed in the stem-loading station A and adjusted in both the cutting and swaging stations B and C are to receive a bottom mica having a pattern of holes. The machine itself forms the holes immediately prior to application of the bottom mica to the wires. Thus the holes which are to be penetrated by the uncut reference wires 6 and 7 are in the proper positions and relative spacing to assure that the bottom mica bm can be mechanically thrust against the wire ends, in alignment with the corresponding holes. The remainder of the holes are accurately distributed to receive the medium length wires 1, 3, 4 and 5 that were correspondingly accurately adjusted in the previous stations B and C. These wires penetrate mica bm at a later station when mica bm is pressed against stops provided by the ends of short leads 2, 8, and 9.

At this station D a further mechanism is included for shifting the short wires to definite positions, when necessary, so that such wires will assuredly not obstruct the side rods of grids that are later inserted.

In the next station E (with the bottom mica bm supported in its intermediate position along the uncut reference wires 6 and 7) a grid g1 is inserted into two of the holes of the bottom mica which are properly located for receiving the grid side rods. This is effected by accurate orientation of the wires 6 and 7, which act in turn to carry the pierced bottom mica into accurate position for receiving those side rods. Since the bottom mica bm is perforated in the machine, specifically at the station D, no precaution is required to prevent inversion of the hole pattern such as might occur if the bottom mica were formed separately and subsequently loaded into this assembling machine. Thereafter, at station E, a metal sleeve, or grid stop gs is formed in the machine and applied to the end of a side rod of grid g1 that projects through the bottom mica, to hold the grid g1 firmly against the bottom mica bm. This grid stop is welded to one of the side rods of the grid g1 at the underside of the bottom mica bm. The sleeve gs, is extremely tiny, when it is borne in mind that the bottom mica bm is of the order of ¼" in diameter. The grid stop is not handled as a separate part but is cut, formed, applied, and welded, entirely within station E. The spacing provided between header h and the bottom mica bm in its preliminary position facilitates the assembling and welding operations. Later, when the bottom mica bm is advanced to its final position, there is little clearance for application of welding tools.

The other side rod of grid g1, extending through the bottom mica bm, ultimately is disposed close to short wire 9 which terminates at the lower face of the bottom mica bm; and in a welding step expediently effected manually, that side rod is joined to wire 9 which constitutes the lead conductor for the #1 grid in the finished, sealed tube.

At the next station F, a second grid g2 is mounted coaxially of and around g1 and the side rods of the grid g2 are forced through the accurately located holes in bottom mica bm; and then the subassembly of grids g1 and g2 and bottom mica are advanced to their final position with the bottom mica in the assembly plane defined by short wires 2, 8 and 9, and abutting against the swaged portions S of medium length leads 1 and 4.

In the grid-applying stations E and F the bottom mica bm is in its intermediate position during the insertion of each of the grids g1 and g2. After the grids have been inserted, the bottom mica bm is finally seated. In the next following stations G and H two portions of a two-part anode may be successively thrust into position on opposite sides of the grids g1, g2 and against the accurately located bottom mica. The two part anode includes a front part a on leads 3 and 4, and a second part a on leads 1 and 5.

In station I a top mica tm is pierced and applied to the long wires 6 and 7 as was the bottom mica bm in station D. In the following stations J and K, wire straps or "hairpins" are formed and inserted for interconnecting the two parts a of the anode, and to hold the top mica tm in place against the top edges of the anode parts. Finally, in the station L of the machine, the excessively long, previously uncut reference wires 6 and 7 are trimmed to a desired length, and the assembled mount is unloaded from the machine.

A further principle will be seen, applied repeatedly in various stations of the machine. In loading the stem into the stem blocks at the station A, the relatively fixed pattern of wires at the locations where they emerge from header h is used as a reference. In stations B and C where the wires are cut and swaged, and in the other stations where the uncut or "long" wires and electrode side rods are held, the possibility exists that any of those long wires or the electrode side rods may be deflected from the reliable pattern defined by the wires closely adjacent the header and/or by the bottom and top micas $bm$ and $tm$. In stations B, C, and D, the long and slender wires extend to unreliable positions at their free ends. The apparatus engages the wires close to the header where the wire pattern may be relied on, and a combing pattern of tool apertures is formed and then moved perpendicularly away from the header $h$ to the position where the cutting die, the swaging die, or the mica-applying head is to engage the previously unsupported and unreliably positioned wire ends. These cutting, swaging and assembling tools then advance along the wires toward the header in a reverse stroke, to reach their final working positions.

The novel step-wise conveyor shown in FIGS 1A and 1B should be properly appreciated, since it is very important to the operation of the mechanism at the several work stations from the stem loading station A to the final trimming and unloading station L. In one respect it might be ideal if the several stem blocks 10 which hold the individual stems at spaces equal to the spaces between the various work stations were part of one rigid disc or turret. In that event, their relative spacings might conceivably be rigidly and invariably fixed. The location of the work mechanisms would then require most remarkable precision, and thermal dimension changes would require special accommodation. In contrast, stem blocks 10 are carried by a link conveyor, in the machine described, in a semifloating condition so that they can be accurately located in each station by mechanism at that station, and to use a linked conveyor, sprocket-supported at its opposite extremities. This concept is applied in my copending application Ser. No. 790,570, filed Dec. 9, 1947. It is of special advantage that a minimum number of strong large links should be used. This minimizes stretching of the links and minimizes the total effects on the conveyor of the looseness and wear at individual pivots, contrasting in this respect from conventional chain conveyors.

Where large links are used, that are wrapped around a pair of spaced drive and guide sprockets, provision should be made for the sprocket shafts to move toward and away from each other as each large link approaches a sprocket, swings around the sprocket, and then leaves. This motion should me minimized to avoid excessive stresses on the conveyor with resulting unreliable positioning of the work holders in the work stations. This sprocket motion is minimized by using an odd number of large links, to insure the presence of one link at only one sprocket, that extends across the line of the two sprocket shafts, while at the opposite sprocket a pair of links form a V-configuration. This condition of a "flat" link at one end and V links at the other changes as the conveyor advances with this V first at one sprocket and then at the other. The arrangement promotes smooth conveyor operation. Because of the large size of the individual links, one of the sprockets is mounted with a yielding bearing permitting sliding movement toward and away from the opposite fixed-shaft sprocket. If a flat link were to pass around a sprocket at one end and a corresponding flat link were to pass around a sprocket at the opposite end, followed by the V-joint between the two links being disposed at one end of the conveyor and a corresponding V-joint at the opposite sprocket, then the yieldably supported sprocket would "bounce" excessively, perhaps to a damaging degree. Also, vibrations would be produced which are undesirable especially in a delicate assembly operation as is here involved.

Accordingly, conveyor 12 is made of an odd number of links, forty-five in the present case, each third link 12a bearing a stem block 10. There are twelve work stations in the machine, with one stem block 10 at each station and with three additional stem blocks in transit around the end sprockets 14 and 16. The end sprocket 16 has a suitable bearing 17 that is horizontally slidable to and from the end sprocket 14, and is spring biased away from sprocket 14, for tensioning the conveyor 12. The conveyor 12 advances stepwise around hub 11. A main drive shaft 18 driven from a motor (not shown) is provided which furnishes power to a suitable intermittent rotary drive transmission 13 (see FIG. 1) effective for indexing sprocket 14 180° at a time followed by idle intervals. A specially desirable form of such intermittent drive transmission 13 for the machine is disclosed in my copending application Ser. No. 294,902, filed June 21, 1952. Since sprocket 14 has six radial sprocket teeth spaced one conveyor link apart, the conveyor advances three links, identified with one stem block, for each advance of sprocket 14. Main drive shaft 18 is geared to continuously rotate horizontal cam shaft 20 continuously and thereby operate a series of control cams to be descibed, and main drive shaft 18 is also coupled via gearing 22 to rotate a series of vertical drive shafts for furnishing continuous synchronized rotary power for shafts 23 at the various work stations spaced along the conveyor.

Sprocket 14 has a pair of pins 24 which are engaged by a locking detent 26 (see FIG. 1A) for arresting and locating the conveyor in the intervals when the various stem blocks are disposed opposite the several work stations. During sprocket indexing motions, detent 26 is withdrawn by a linkage 28 of any convenient design operated by a cam 30 on continuously rotating cam shaft 20.

The drive mechanism in FIGS. 1A and 1B includes a further pair of cams 32 on cam shaft 20 (see FIG. 2) for rocking levers 34 which, through segmental gears 34a and pinions, 36a, cause rock shafts 36 to oscillate. These rock shafts extend along all the work stations. Their purpose is to operate the clamping mechanisms, to be described, for arresting and accurately locating the stem blocks 12 in the several work stations. Additionally, continuously rotating cam shaft 20 furnishes power for mechanically opening the various stem blocks 12 at certain times in the sequence of operations. For this purpose, cam shaft 20 carries a series of cams 38 which, through mechanism that includes cam followers 40 operate jaw opening wedges. The two cam followers 40 seen to the left in FIG. 1A are seen to operate through crank shafts 40' to actuate the jaw openers in the loading and unloading stations A and L.

Figure 2:
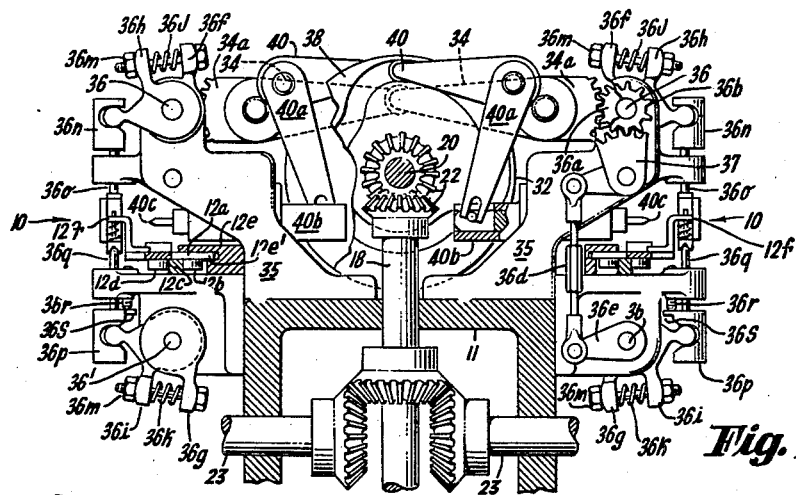
FIG. 2 is an elevation in cross-section along the line 2—2 of FIG. 1 but at larger scale, showing the jaw-opening mechanisms for the stem blocks or work holders and the drive mechanism of the several stations of the machines.

The cams shown in FIG. 1A appear in end projection in FIG. 2, together with an end projection of the locating and jaw-opening mechanism for the stem blocks at the respective stations. As seen in FIG. 2, each cam follower 34 at each station, caused to oscillate by a constrained cam 32 on the common cam shaft 20, operates a segmental gear 34a which in turn oscillates pinions 36a (see also FIGS. 1A and 1B) on rock shaft 36 in bracket 35. A separate pinion 36b is fixed to the shaft 36 at each work station, and operates through a segmental gear 37 and link 36d to oscillate a lever 36e and a rock shaft 36' in the direction opposite rock shaft 36. Fixed to each of the common rock shafts 36 at both sides of the machine, as shown in FIG. 2, is a series of arms 36f, one for each work station, and also fixed to rock shafts 36' is a further series of arms 36g. Pivotally supported on shafts 36 and 36' are additional arms 36h and 36i, respectively. Arms 36f and 36h at the respective stations are urged apart by coil spring 36j, while arms 36g and 36i are urged apart by coil springs 36k.

The several sets of arms 36f–36h, and 36g–36i are held together by bolts 36m. Accordingly, as the respective arms 36f are oscillated counter-clockwise (at the left of FIG. 2) by rock shaft 36, the associated arms 36h are yieldably carried along. Similarly, as arms 36g are oscillated clockwise (at the left of FIG. 2) by rock shaft 36', arms 36i are yieldably carried along. Arms 36h at the respective stations are seen to have lateral extensions engaging vertical slides 36n, each supporting a single pin 36o, while arms 36i are seen to have extensions engaging slides 36p each supporting a vertically reciprocating pair of pins 36q. These pins are shown also in FIG. 3. Each of the slides 36p carries a stop 36s engaging an adjustable screw stop 36r fixed in the machine frame so as to limit the upward stroke of the slide 36p.

The single pin 36o and the pair of pins 36q reciprocate oppositely, as a pair of jaws, for seizing the stem block 10 at times when the conveyor 12 brings successive stem blocks opposite these pins and for locking the stem block in place while the conveyor remains at rest. Pins 36q raise the stem block yieldably to a fixed limit. Pin 36o yieldably drives the stem block in the opposite direction.

As the cam followers 34 rock shafts 36 and 36' to oscillate the mechanisms described, springs 36j and 36k transmit the oscillatory thrust to the pin 36o and the pins 36q which seize each stem block. However, at each station, spring 36k is deliberately made substantially stronger than spring 36j and for this reason the upward stroke of the pin set 36q is more forceful than the downward stroke of pin 36o. Accordingly, the level at which each stem block 10 is finally positioned is determined by the adjustment of screw 36r. The downward stroke of pins 36o is adequate to grip the stem blocks, but not so forceful as to depress pins 36q.

The foregoing mechanism will be seen to be the mechanical analogue of the pneumatic conveyor-block gripping mechanism disclosed in my copending application, Serial No. 790,570, filed December 9, 1947.

FIG. 2 shows the constrained cams 38 and the cam followers 40 which were previously described for the purpose of operating the stem block jaws 10i, 10j for seizing and releasing the stems. Specifically, cam followers 40 are seen to have arms 40a for driving opposed slides 40b outwardly. These slides carrying wedges 40c which engage the stem block jaws and periodically separate the jaws at times and in stations where necessary, as will be described in detail below. The stem block jaws are opened to receive a stem in the stem-loading station A and to release the completed stem in the stem-unloading station station L. Additionally, the stem block jaws are quickly opened and closed in each of the two work stations immediately following the stem loading station, namely the lead trimming and swaging stations B and C. It will be understood that all of the cam shafts, drive shafts and slides described have bearings in frames 11 and 35, details of which need not be described.

Figure 2A:
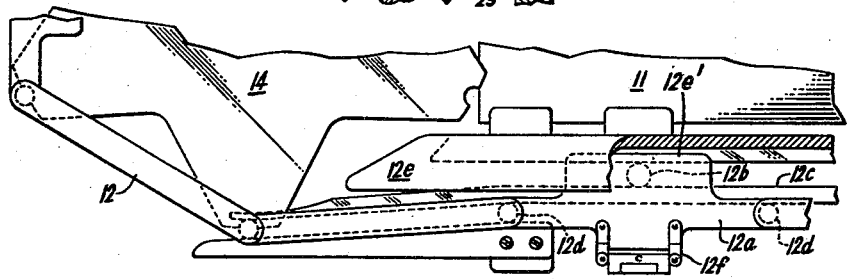
FIG. 2A is a portion of FIG. 1A at larger scale showing details of the link conveyor for the stem block and the guide mechanisms for maintaining the stem block along a predetermined path during travel through successive stations.

The links of conveyor 12 carrying the stem blocks 10 are shown in detail in FIGS. 2 and 2A. Link 12a bearing a stem block 10 carries roller 12b and rollers 12d disposed respectively behind and in front of rail 12c. The rollers 12b and 12d cooperate with the rail 12c to guide the chain conveyor along an accurate path through the machine. A further fixed frame plate 12e overlies rearwardly projecting plates 12e' and links 12a for preventing the links from tipping. Each of the stem-block supporting links 12a has an outwardly projecting bracket 12f for the block 10. Rollers 12d cooperate with the sprockets, while each roller 12b is received between the sprocket arms.

The operation of the mechanism described to this point will be readily understood. Main drive shaft 20 rotates continuously to drive sprocket 14 intermittently 180° at a time. Sprocket 16 is driven by the chain conveyor and supports and yieldably tensions the chain conveyor 12.

Locking detent 26 is reciprocated in timed relationship to the indexing operation of sprocket 14 for arresting the conveyor in accurate indexed positions and for precluding movement of the drive sprocket 14 between indexing operations. Rock shafts 36 raise the respective single pins 36o and rock shafts 36' lower the respective sets of pins 36q for releasing the stem blocks 10 during indexing and operate reversely for gripping the blocks 10 when the chain conveyor 12 comes to rest. Adjustable stops 36r, with the effect of unequal springs 36k and 36j, determine the elevation of the stem block 10 when it is locked in position. At an appropriate time in the operating cycle of the machine, while the stem blocks 10 are gripped by cooperating pins 36o and 36q, cam followers 40 operate wedges 40c to open the stem-block jaws, the details of which are described below. The links 12a of the chain conveyor 12 which carry the stem blocks 10 are accurately guided along the path fixed by rail 12c and the cooperating rollers 12b, 12d.

Figure 4:
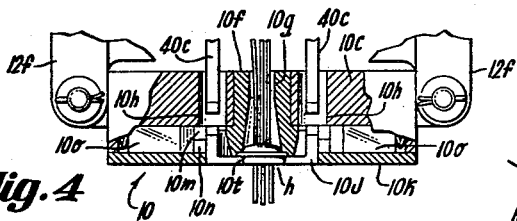
FIG. 4 is a sectional view taken substantially along the line 4—4 of FIG. 3 and looking in the direction of the arrows.
Figure 5:
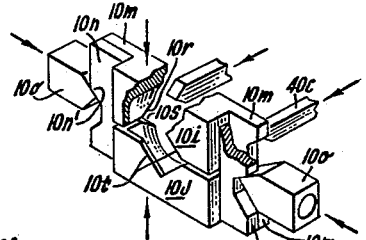
FIG. 5 is a perspective view, with parts broken away, of the stem block illustrated in FIGS. 3 and 4.
Figure 3:
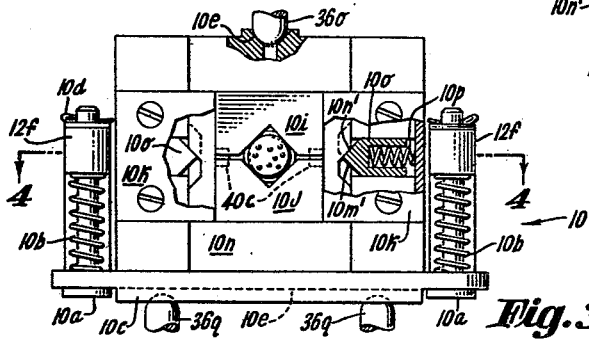
FIG. 3 is an enlarged fragmentary elevation, with parts broken away and sectioned, showing the details of the work holder or stem block.

The stem blocks 10, briefly described in connection with FIGS. 2 and 2A, are shown in greater detail in FIGS. 3, 4, and 5. Each stem block 10 is suspended on the outwardly extending brackets 12f of the supporting conveyor link 12a by pins 10a extending through enlarged bores in the bracket 12f, one pin appearing at each side of the stem block 10. Springs 10b surround pins 10a and bias the body 10c downward as limited by pins 10d. Body 10c is formed with respective channeled and conical recesses 10e providing bearing seats for the gripping pins 36o and 36q. Pin 36o, in its conical seat 10o, centers the block from left to right as viewed in FIG. 3. Body 10c has a central insert 10f constituting a seat for the glass header h, the insert 10f being formed with a passage 10g for receiving the projecting wires extending from header h. In addition, a pair of passages 10h on opposite sides of the insert 10f admit jaw opening wedges 40c when projected by the cam mechanism 40, 40a, and 40b previously described.

The body 10c slidably supports a pair of vertically movable jaws 10i and 10j, disposed in front of insert 10f for pressing header h against the insert and for gripping and centering the header h. A pair of plates 10k are fixed to the body 10c for slidably confining the jaws 10i and 10j. As seen in FIG. 5, each side of upper jaw 10i has a lateral extension 10m that lies behind a similar lateral extension 10n on lower jaw 10j.

The upper and lower jaws 10i and 10j are urged toward each other by a pair of inwardly spring biased wedges 10o each of which has a compression coil spring 10p. Wedges 10o coact with sloping faces 10n' of side notches in the lattera1 extensions 10n of the lower jaw 10j and with sloping faces 10m' of side notches in lateral extensions 10m of the upper jaw 19i.

Inward pressure by compression springs 10p forces wedges 10o to concurrently raise the lower jaw 10j and depress the upper jaw 10i, to firmly grip the header h. The jaws force the header h firmly against seat provided by the insert 10f by virtue of sloping header-engaging surfaces 10t of the jaws.

Jaws 10i and 10j have reversely sloping cam surfaces 10r and 10s (see FIG. 5) in their rear surfaces engaged by wedges 40c when it is necessary to open these jaws.

From the foregoing, it is seen that the stem blocks 10 are relatively loosely suspended from brackets 12f of the conveyor 12 and accordingly the conveyor 12 is only relied upon to transport the stem blocks 10 to successive positions to a first degree of accuracy. Thereafter, gripping and locating pins 36q and 36o accurately fix the location of the stem blocks 10 after the conveyor 12 has come to rest. Between those brief intervals when wedges separate jaws 10i and 10j, spring biased wedges 10o urge jaws 10i and 10j toward each other for resiliently gripping and centering the header h and for firmly seating the header. The headers are gripped at all times, both when the conveyor 12 is advancing and when it is at rest, except in the four stations A, B, C and L as previously mentioned. By virtue of the stem-block gripping mechanism, which accurately locates the stem-block 10 in each of the work stations, and the further header-gripping mechanism in the stem-block, the stem is successively positioned in the several work stations to a high degree of accuracy with front-to-rear and rotational orientation preserved continuously after it is once perfected.

The timing of the drive and indexing mechanisms, utilized in the various stations to be described, is represented in FIG. 11. Sprocket 14 is intermittently advanced by any suitable continuous-to-intermittent drive means 13, illustrated in FIG. 11 to complete the conveyor advance in the interval 35° to 115°. Gradual acceleration and deceleration, together with rapid operation, is to be desired. Cam 30, which operates conveyor detent 26, advances the detent into the path of the next pin 24 after the pin previously released has been carried part way around with the sprocket. Firm locking of the sprocket by cam 30 and detent 26 is effected after conveyor drive has ceased.

Cams 32 operate the stem-block gripping pins 36o and 36q to seize and release the stem-block at the beginning of each cycle of operation of the tools on the stems in the respective stations, blocks 10 being locked in place as early as practicable and being released as late as practicable. This is indicated by the timing curve 32 in FIG. 11 corresponding to the drive effected by cam 32 in FIGS. 1A and 2.

Cams 38 operate wedges 40 to release the stems in stations B, C, and L, and to open the stem holders arriving in station A. Each station requires its own cam 38 and its own timing curve 38 represented, in FIG. 11, as will be appreciated when considering the various stations A, B, C and L specifically.

A feature of the invention represented by the mechanism in station A involves the location of a part in a preliminary orientation followed in later stations by successive refinements in the preliminary orientation. This assures reliable performance of the assembly machine despite inaccuracies or loose tolerances in the dimensions and in the distribution of the parts involved.

An important consideration in assembling the electrodes on the stem h having the series of wires 1 to 9 inclusive molded in a predetermined pattern involves the accommodation of stems in which the highly flexible wires are in a predetermined arbitrary pattern. The wires may not be distributed in a precise predetermined pattern, due to a certain degree of required looseness of the wires when received in passages in the molding dies where the stem was formed. Much more serious is the fact of random deformation of the comparatively long and slender wires incidental to handling. After loading of stems, the machine corrects wire deformity.

The details of station A are shown in FIGS. 6, 7, 8, 8A, 9, 10 and 10A, wherein there is illustrated mechanisms for initially loading a stem into the stem block 10 previously described. The loader not only inserts a stem into the stem block 10, but additionally predetermines the orientation of the wires 1 to 9 inclusive in relation to the stem block 10. There is no critical physical dimension which is utilized in the stem block 10 to predetermine the rotational orientation of the stem in the stem block, but instead, the stem loader itself is relied upon to insert the stem with particular wires in positions required for functioning of succeeding work station. Thus wires 6 and 7, considered as reference wires, are to be disposed one above the other in a vertical plane while the wires and the axis of the stem are horizontal. These conditions are obtained while the glass header is seated against the insert 10f in the stem block 10. Wire 7 is disposed above wire 6, and the remaining wires are distributed in the initial pattern determined by the glass molding operation. In station A, the stems are manually deposited on the blades of a feed plate turret, with no more than rough orientation required of the attendant. From this point, the mechanism performs automatically with progressively increasing precision in stem handling and in stem-wire "tailoring," including straightening, cutting, pattern-adjustment and swaging of the wires.

In FIG. 6 the general organization of the stem-loading station A is shown, the mechanism for operating certain parts being shown in FIG. 8. The stem loading mechanism includes a step-wise advanced carrier or turret 41, a set of transfer fingers 42, a pair of transfer arms 44 and 45, a split-funnel wire guide 46, and the necessary operating mechanisms coordinated as shown in the cam chart of FIG. 12. In FIG. 10A there is shown a holder 41a of the carrier 41 having a blade 41b extending between reference wires 6 and 7 arranged on one side, and wires 1, 2, and 3 on the other side. Blade 41b is approximately the maximum thickness permitted by the separation of these two groups of wires and so may be said to be tightly confined or "wedged" between them. Whether tight or loose, the stem rests on the edge of its blade and is prevented from tipping radially on the turret by the length of the blade engaged by the glass of the stem and is further prevented from tipping across the blade edge by the width of the blade engaged by the wires. Blade 41b penetrates the extending array of wires and serves to initially determine the rotational position about the stem axis in which the stem is ultimately loaded into the stem block 10.

The stems h are loaded manually or by appropriate automatic mechanisms onto the respective holders 41a, conveniently at the extreme left of turret 41 as seen in FIG. 6, and from this position the stems are indexed in the clock-wise direction, when looking down on the turret. As the turret 41 indexes, the stem are carried into a transfer position between transfer fingers 42 and the adjacent stem block 10 on the conveyor 12.

Turret 41 is supported on an upright shaft 41c journaled in a fixed bearing 41d. Supported on the lower face of turret 41 is a series of cam followers 41e which (see also FIG. 7) cooperate with a constrained barrel cam 41f having an integral medial rib 41g filling the space between two successive cam followers 41e. The rib 41g blocks the turret 41 during part of the cam rotation. Additionally, barrel cam 41f has two curved runs 40h for producing the desired cam indexing motion. Barrel cam 41f rotates in a fixed bearing 41i (see FIG. 6) and is driven by a sprocket and chain drive including a sprocket 41j, a sprocket 41m, and a chain 41k trained over the sprockets. The sprocket 41m is on a secondary drive shaft 41n driven through bevel gearing from unit drive shaft 41p, the latter being coupled, as described above, to the main drive shaft of the machine. A suitable single-revolution electromagnet-controlled clutch 23a is interposed in the main drive shaft connection of this unit to the main drive of the whole machine, for control by appropriate manual or automatic devices, and a like clutch is included in the drive connection of each of the other units driven by shaft 20. Turret 41 carries a stem h into range of transfer fingers 42 for each relsution of the main drive 20.

The purpose of transfer fingers 42 is to shift the particular stem on a blade 41b on to an aligned blade 44a of the transfer arm 44. Transfer fingers 42, seen best in FIG. 8 (as viewed looking toward a stem block with turret 41 removed) are swingably supported on one end of a lever 42a having a central pivot 42b and a cam follower 42c on its opposite end. The lever 42a is biased by spring 42d against upstanding edge cam 42e on the shaft 41n.

When turret 41 has carried a stem to the transfer position in front of the horizontally extending transfer fingers 42, and when transfer arms 44, 45 are in their vertical position with the blade 44a aligned with and bearing against the blade 41b (FIG. 10A), the transfer fingers 42 are operated by cam 42e to displace the stem from the turret carrier 41a to the transfer arms 44, 45. The transfer fingers 42 follow the transfer arms 44, 45 arcuately toward the stem block 10 to provide the requisite support, but are quickly returned to the position shown in FIG. 6 prior to or during the next indexing of the turret 41. Accordingly, after the turret indexes one step, the next stem will be disposed in the transfer position in front of transfer fingers 42.

The transfer fingers 42 and their supporting lever 42a, cam follower 42c and operating cam 42e are shown best in FIG. 8 wherein there is illustrated an additional novel feature. A test or detecting finger 42f is carried on an insulating block 42g to move with transfer fingers 42. In the event that no stem is present on a carrier 41a for transfer operation to a particular stem block, then an electric circuit is conditioned appropriately to suppress operation of the further assembly mechanisms in succeeding stations which would otherwise operate on the stem carried by the particular stem block during the processing cycle. The suppression of operation of the further stations in respect to the empty stem block is effective in saving parts which cannot be assembled for lack of a stem in the stem block. Delayed control (S.N. 790,570) disables clutches 23a.

A split-funnel wire guide 46 and associated operating mechanism, shown partially in FIG. 6, are more completely illustrated in FIGS. 8 and 8A. The guide 46 includes two pivoted arms each having a funneled or flared portion 46c in the face 46a closest to the transfer arms 44, 45. Each arm has a smaller generally cylindrical portion 46c reaching face 46b (FIG. 6) facing stem block 10. The guide or funnel 46c is split and formed on the separate arms of the guide which swing reversely with pivoted pinions 46d and 46e. The pinion 46e is engaged by a segmental gear 46f, spring-biased to close the split funnel. Normally the funnel arms are spread apart to provide a clear passage between transfer arms 44, 45 and the stem block 10. Segmental gear 46f is positively driven downward through link 46g coupled to bell crank lever 46h. Bell crank lever 46h, pivoted intermediate its ends and rocked counter clockwise by link 46i, is coupled to a further bell crank lever 46j carrying cam follower 46k engaging edge cam 46m on the shaft 41p that is geared to shaft 41n. Spring 46q connected to bell crank 46j, biases the linkage between segmental gear 46f and the cam follower 46k in the reverse direction. Cam 46m opens split guide funnel 46 at all times except during actual insertion of the forwardly projecting wires into the hollow stem block insert 10f.

The transfer arms 44 and 45, which receive the stems from turret carrier 41a, are effective to swing the stems from a vertical stem-receiving position to a horizontal stem-inserting position, whereupon the stem wires are thrust endwise into the hollow insert 10f of the stem block 10, via split funnel 46. The transfer arms 44, 45, are shown greatly enlarged in FIG. 9, and their operating mechanisms appear in FIGS. 6 and 8. The transfer arm 44 has a pivot 43a journaled on a carriage 44b, the latter being horizontally slidable along a horizontal pair of guide rods 44c. The carriage 44b is biased by spring 44d toward the stem block 10, that is, in the direction of inserting a stem into the stem block 10. The carriage 44b is positively driven away from the stem block 10 by a lever 44e and cam follower 44f engaging cam 44g on shaft 41n. Lever 44e and cam follower 44f are interconnected by a long shaft 44h (FIG. 8) mounted for oscillation in fixed bearings.

As seen in FIG. 9 the transfer arm 44 has a rearward extension 44i which is capable of swinging clockwise under action of torsion spring 44j to engage a stop 44k on carriage 44b. The cooperating extension 44i and the stop 44k accurately arrest the transfer arm 44 in the horizontal stem-inserting position. The transfer arm 44 has a cam follower 44n bearing against stationary cam 44m. Arm 44 is raised from the horizontal when carriage 44 moves away from the stem block 10. When the transfer arm 44 and the integral cam follower 44n are carried with carriage 44b to the right and toward the stem block 10, transfer arm 44 is swung clockwise into horizontal stem-inserting position. This is shown in progressive stages in the first three diagrams of FIG. 10. It is seen that transfer fingers 42 push the header 41b or stem h from the turret 41 and its supporting blade 41b to the transfer arms 44, 45. In the first part of FIG. 10, fixed cam 44m engages rearwardly extending cam follower 44n to maintain transfer arm 44 in the vertical stem-receiving position.

As carriage 44b moves to the right in FIGS. 6 and 10, cam follower 44n gradually slides off the stationary cam and spring 44j urges the transfer arm 44 clockwise and into the horizontal stem-inserting position with extension 44i against abutment 44k.

Transfer arm 45 is carried by pivot 45a in transfer arm 44 and biased against transfer arm 44 by a torsion spring 45b, so that the two arms may move as a unit, horizontally and arcuately as shown in the first three phases of FIG. 10. Transfer arm 45 has an integral rearwardly extending cam follower 45c, whose function will be clear from the following.

The purpose of transfer arm 45 becomes apparent from the third and fourth views of FIG. 10 where the stem h is seen to extend horizontally. In the event that the transfer arm 45 were omitted, there would be considerable danger that, despite the frictional engagement of the wires with blade 44a, the stem still might shift or fall from the single transfer arm 44. By the time the extending wires on the stem h enter and pass through the split-guide funnel 46, the transfer arm 45 has served its intended purpose. As carriage 44b continues its horizontal travel to the right in FIG. 10 cam follower 45c, comes into engagement with a fixed cam 45d. The transfer arm 45 is thereby swung to an inoperative position of clearance, seen in the last diagram of FIG. 10. With the transfer arm 45 out of the way, the transfer arm 44 with its supported stem approaches the split guide funnel 46. After the funnel 46 has guided the leads into the stem block 10, the funnel, too, is removed and transfer arm 44 is effective to complete the insertion of the stem into stem block 10. Thereafter, jaws 10i, 10j of the stem block 10 are closed by proper coordination of the jaw-opening wedges 40c previously described. When the stem block jaws 10i, 10j have seized the glass header of the stem, carriage 44b slides horizontally to the left in FIGS. 6 and 10, thereby withdrawing the transfer arms 44, 45 from the projecting stem wires.

The wires extending through the insert 10f of the stem block 10 ultimately will constitute the external terminals of the completed electron tube, while the wires projecting from the front face of the stem block 10 will be variously processed and used in the assembly of the mount, as will appear.

In review, preliminary orientation of the stems to be located into stem block 10 is effected with the aid of blades 41b projecting radially from turret 40 during loading of the stems onto the holders 41a. By the cooperative effects of transfer fingers 42, transfer arm 44 with its transfer blade 44a, and transfer arm 45, this orientation is maintained as the stem is inserted into stem block 10. The leads that project from the face of the stem block 10 are thus disposed in the pattern required for operations at further stations. The glass header is pressed by stem block jaws 10i and 10j with their sloping edges against the seat provided by block insert 10f.

Figure 12:
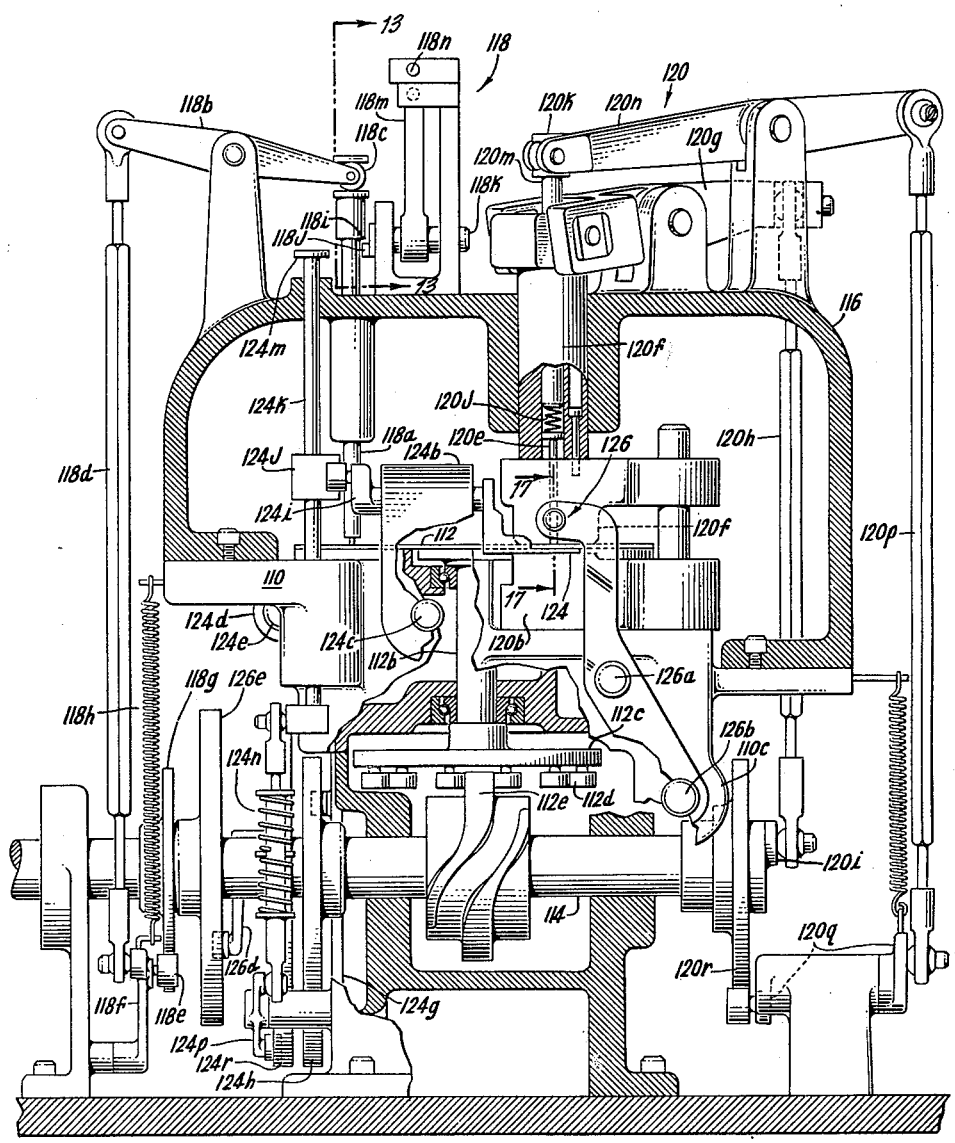
FIG. 12 is an elevation in cross-section taken generally along the line 12—12 of FIG. 11, with parts broken away.

The timing of certain cam-operated mechanisms in station A is represented in FIG. 12. There it is seen that cam 44g operates carriage 44b carrying transfer arms 44, 45 to the left (FIG. 6) and to upright position near the start of the cycle. Thereafter transfer fingers 42 are advanced to bear against a stem and push it from plate 41 to arms 44 and 45. Split funnel 46m closes in front of a stem block that had just been carried to station A by the conveyor, as represented by the drop in curve 46m. Arms 44 and 45 start to travel toward the stem block near the 200 degree point in the cycle (curve 44g) and cam 42e continues to swing fingers 42 with arms 44 and 45 until those arms approach the horizontal. Carriage 44b advances arms 44 and 45 further toward the stem block while jaws 46 are closed, but near the end of travel of those arms jaws 46 open and the stem is seated in the stem block.

Cam 38 which operates the stem block jaws in station A should have a drop shortly after the conveyor comes to rest, and should have a rise while cam 44g has its dwell (305° to 320° in FIG. 12) so that the inserted stem is seized before arm 44 is withdrawn.

While one stem is being loaded into the stem block as decribed, arm 42 is swung to the extreme left by cam 42e, and feed plate indexing cam 41f advances the feed plate 41 one step to bring the next stem in front of fingers 42. Arms 44 and 45 then return in readiness for the next machine cycle.

The glass header may vary in diameter and in thickness, but the self-centering characteristics of the stem block jaws, and the sloping surfaces of the jaws that engage the glass are effective to accommodate wide variations in glass dimensions.

In order to more fully appreciate the mechanism illustrated herein, the operation at the various work stations will now be described, the specific elements of these stations are shown in detail in my Patent No. 3,069,749, of which the present application is a division.

The pattern of wires as oriented in station A where the stems are loaded into the stem block 10 is relatively critical in relation to the next operation at station B.

The stem loaded into the stem block 10 in the stem loading station A has wires projecting from the stem block, all approximately equal in length and longer than is needed in the final mount M. A group of these leads are to be trimmed to a short length to serve as an abutment or mechanical stop for supporting the bottom mica bm, and a further group of these leads are to be trimmed to an intermediate length for penetrating and extending a limited distance through the bottom mica bm.

The stem is loaded into the stem blocks 10 on the conveyor 12 is centered in the stem block jaws and held against the stem block insert as a seat; but the orientation of the pattern of wires rotationally is established only to a preliminary degree of accuracy in loading station A. Both the shortest leads and the intermediate length leads are sheared in the lead-trimming station B by a die block or fixed cutting member which serves a further important function, namely, to orient the stem in the stem block to a more precise degree of accuracy; and, as a still further function, to bend and adjust individual wires that might have been positioned inaccurately in the glass button by the previous stem-molding operation. In vacuum tube practice, wires may be in a "pin circle" or they may have a "random" pattern so as to occupy arbitrary positions in the glass header. The present stem has an arbitrary pattern of leads; but when the parts are to be automatically assembled, those leads should be in the predetermined pattern to a high degree of accuracy. The comparatively crude distribution of leads, as they reach the present machine, where they are formed with broad tolerance and further deformed in handling, is corrected in the present station, and further perfected in the next following station.

At the conclusion of the operations for accurate adjustment of the wires by bending where necessary, and shearing of the several wires to the required lengths, the cutting member is withdrawn. However, before this is done, jaws 10i and 10j of the stem block 10 again close on the glass button or header h and hold it against the seat provided by insert 10f.

A prominent feature of the lead-trimming station B is the combing action by which leads, extending a substantial distance away from the glass button at which the leads are relatively rigidly located, are carefully and precisely adjusted. This permits a tool to operate precisely on each of the wires even at a great distance from the stem block where, but for the combing action, it would be futile to expect the leads to be properly disposed. This principle will be noted in several of the work stations that follow. The combing action described is seen to include a closing-in of multiple coacting jaws forming a template through which the leads extend. These jaws close on the wires at a point immediately adjacent the stem block where the wires cannot have been greatly deformed in handling the stem, and thereafter the template or apertured pattern is drawn perpendicularly away from stem block 10 to accurately locate the free ends of the plural wires in proper condition for further processing. This stroking action is utilized in several stations. In station B, it is effective for threading the wires into apertures provided in the die block for subsequent cutting, patterning and rotational adjustment of the stem. During the forward stroke of the die block toward the stem block 10, accurate lateral adjustment of the several wires is brought about by bending of the wires, the header being released for rotation of the header h in the stem block. When the die block is close to the stem block 10, the jaws 10i, 10j again grip the reoriented header.

The particular purpose of the mechanism in station C, of the illustrative mount machine, is to swag multiple leads to form shoulders S against which the bottom mica bm may rest. These shoulders or abutments S, formed on medium length leads 1 and 4, cooperate with the short leads 2, 8 and 9 (defining the plane for the bottom mica bm) to assure further stability in the final mount. The swaged intermediate-length leads extend through the bottom mica bm and afford projections to which the anode parts are assembled and welded, as will be seen.

In addition to this swaging operation, the pattern of leads is in the station C to facilitate the swaging. The pattern of leads and the rotational adjustment of the stem about its axis is adjusted as a further refinement of the progressive orientation by opening the stem block jaws 10i, 10j while the combing tools are quite close to the stem block 10, and while the swaging tools are effective to form the shoulders S.

The opening of the stem block jaws at the precise time that the swaging tools engage the slender leads has a further important effect. If there is even slight misalignment between the swaging tools and the leads projecting from the glass button or base of the stem h, it is very possible that the leads being swaged might be broken or sheared off, or the glass button might be cracked. However, since the jaws of the stem block are released during the swaging tools affect the leads alone and do not tend to tear the leads away from the glass button.

During the swaging operation the header engaging jaws of the stem block 10 spread so that the stem on which the work is performed is carried not by the conveyor but by the tools in the work station. This principle is used in the preceding lead-trimming station; and in somewhat modified form it is applied in the stations where the bottom mica and the grids are applied, as will be seen.

Immediately after the swaging tools open, the stem block jaws close, and the swaging and gathering tools are retracted to clear the way for the swaged stem to advance and for the next stem to enter the station.

*Bottom mica station D*

The fourth station D uses part of this same principle of adjusting the position of the work carried by the workholder to a very high degree of accuracy in the work station, just as the wires are severally located for cutting and swaging in the second and third stations. In the bottom mica-applying station D, the stem h is to receive a pierced mica disc bm, assembled on the stem by disposing ends of the stem wires opposite holes in the mica, and advancing the mica with its flat side facing the stem block. For a special reason which will subsequently become apparent, the mica is not to be forced very close to the glass button. The glass button remains gripped by the stem block 10 in the mica-assembling station D.

The wires to be threaded through pierced holes in the mica were combed and straightened in the preceding cutting and swaging stations, but they do not project in the precise positions required by the mica-applying tools. The devices in the bottom mica station take the mica-receiving wires in hand and locate the wires very accurately to allow proper assembly of the pierced mica. This "taking in hand" of the critical part of the workpiece to accurately locate the same without depending on extreme precision as to its location in the work carrier, is a significant feature in this station as well as in the other stations of the machine.

A further very important feature of the mica-assembling station D is the concept of piercing the mica in the very support that carries the pierced mica to the stem wires. By piercing the mica in the applying mechanism the assurance is inherently realized that the holes will be in the proper positions for application to the supporting wires. It would be a most severe undertaking to locate micas with the required accuracy were the micas pierced previously in a separate machine, considering the tiny mount here of concern. It should be recalled that the high degree of accuracy required by the tiny parts being handled is a controlling consideration in this embodiment. Accordingly, the concept of piercing the part in the very holder which assembles the pierced part is most valuable; it eliminates need for any preliminary orientation of the work prior to loading into the assembly machine and the incident risk of misalignment.

The operations effected by the fourth station D which loads the bottom mica $bm$ onto the stem wires, is illustrated in greatly enlarged views FIGS. 17 to 22, inclusive. In FIGS. 17 and 18 a mica punch is shown having an upper die structure 120 slidably supporting piercing dies 120a and stripper plate or pad 120c. Below the upper die structure 120 is a feed turret 112 that has mica-supporting seats or apertures 112a through which the stripper plate 120c is free to pass. The feed turret 112 is intermittently indexed in a horizontal plane about a vertical axis to carry a disc of mica into a piercing position directly beneath the die 102a, moving away from the observer in FIGS. 17 and 18. Below the upper male die 110 is a fixed complementary female die member 120b arranged to receive the piercing elements 120a and providing a discharge passage for the waste mica fragments. Between disc or turret 112 and female die member 120b is a transfer plate 124 whose function is to receive the mica, contain it while it is pierced, carry it to the stem, and apply it to the appropriate stem wires that are critically positioned, as further detailed below.

When the feed turret 112 carries a disc of mica into the piercing position under the piercing die 120a, the mica carried in aperture 112a is in line with the registering upwardly flared aperture 124a in plate or transfer blade 124. Aperture or seat 124a is of a diameter such as to fit tightly around the mica, providing a force fit with the mica discs used. This tight fitting transfer plate acts as a containing die ring to prevent the piercing punches near the edge from splitting the mica from the hole to the edge.

In operation, the feed turret 112 carries a disc of mica over the seat or aperture 124a of the transfer blade 124 and stripper plate 120c presses the mica from aperture 112a into the seat 124a so as to lie against the lower fixed die 120b. Thereupon piercing elements 120a form the required pattern of holes in the mica and are withdrawn, and the stripper plate 120 is raised. Feed turret 112 is free to index to bring the next mica into the piercing position. The mica is firmly wedged into the seat or aperture 124a, with the pierced holes precisely oriented, to be reliably carried to the stem by the transfer blade 124.

In the piercing operation as illustrated in FIGS. 17 and 18, the mica is perforated with a pattern as in FIG. 19, shown enlarged several times. The transfer blade 124 is withdrawn horizontally from between the feed turret 112 and lower stationary die 120b, and is swung to a vertical position, as in FIG. 20. In this position, the mica disc $bm$ is interposed between a pusher unit 126 and the cut and swaged stem carried by a stem block 10 into the mica-assembling station D. The holes in the mica are to mate with the patterned cut and swaged wires projecting from the stem. The transfer blade 124 carries the mica $bm$ to those wires of the stem which have been accurately positioned for this purpose by combing and gathering tools in this station. Two sets of gathering tools 128, 130 are used for carefully aligning the free ends of uncut wires 6 and 7 to which the mica is to be applied. These tools are described below in greater detail. After the tools locate the wire ends, blade 124 advances to force the mica onto the wires. The pusher unit 126 is effective in the final part of the operation (FIG. 22) for driving the mica disc out of transfer blade 124. The parts are thereafter returned to their respective starting positions, and blade 124 receives the next mica disc for the next stem to reach the mica-assembling station D. Paired tools 128 and 130 move apart before moving away from the stem block 10, leaving bottom mica $bm$ in the position shown at that stage. The tools are all to the left of the stem wires as viewed in FIGS. 20–22, so that the stem can travel laterally as the stem block advances with the conveyor.

The mechanisms for forming the bottom mica and applying it to the stem are shown in greater detail in FIGS. 11 to 16. In FIGS. 11 and 12, there is seen a stationary table 110 which constitutes a flat fixed support. A series of bottom micas are manually loaded into feed plate or turret 112 that is in sliding face-to-face contact with table 110. The micas are advanced in sequence from the manually loading area, represented by the portion of plate 112 that appears in FIG. 11. The feed turret 112 is carried by shaft 112b at the lower end of which there is a plate 112c carrying a series of cam followers 112d on its lower face. These cam followers engage a cam 112e rotatable on a horizontal drive shaft 114 for indexing the mica feeding turret 112 stepwise, through an arc corresponding to the peripheral spacing of the holes or seats 112a.

A stationary frame 116 overlies a portion of the mica feed turret 112 (see FIG. 11) and carries a number of operating mechanisms. These gauge and detect the presence of micas in the seats or holes 112a, and accomplish the further functions as will be seen. As the turret travels counterclockwise in FIG. 11, it passes the gauging station 118 and later to the mica piercing-station 120. It is important that only one mica shall reach the piercing die, and it is important that a mica shall surely be assembled on each stem carried by the stem blocks 10 to the mica-assembling station. The gauging mechanism is incorporated in the bottom mica station D in order that the punch may not be wrecked by excessively thick micas or accidental loading of double micas in individaual holes 112a, as well as for controlling machine operation in the event that no mica has been inserted into a hole 112a. As seen best in FIG. 12, gauge 118 includes a vertically slidable feeler shaft 118a, mounted in frame 116 and pressed against a mica brought into registry below it by the feed turret 112. Feeler shaft 118a is raised and lowered by oscillatory lever 118b having a roller 118c at its right end in FIG. 12 riding in a horizontal channel at the upper end of feeler shaft 118a. Lever 118b is oscillated by link 118d and is operated by cam follower 118e (see also FIG. 11) carried on the arm 118f and biased by spring 118h against cam 118g on shaft 114. The cam 118g acts positively to raise feeler shaft 118a, and spring 118h biases cam follower 118e against the cam 118g and urges feeler shaft 118a resiliently downward against the micas in holes 112a of the indexed feed turret. Feeler 118a thus bears yieldingly downward against the micas in holes 112a of the indexed feed turret 112.

Movement of the feeler shaft 118a rocks multiplying arm 118m through an arc accurately representing the thickness of the mica above the table 110. As best seen in FIGS. 12 and 13, downwardly biased feeler shaft 118a has a shoulder 118i that engages crank 118j of horizontal shaft 118k causing the multiplying arm 118m to rock toward one or the other of the electrical contacts 118n carried by insulating supports, or to rest between those contacts. If the mica under test is too thin or missing, or if there is an excessively thick or a double mica in the seat 112a of the feed turret 112, the arm 118m will complete a suitable circuit (not shown) through one of the contacts 118n, for shutting down the entire machine including the mica piercing and applying mechanism until the mica operation can be corrected. It is important that all of the mounts passing the bottom mica station D shall have bottom micas. The very fine piercing die, incorporated in the machine to attain the high precision of location of the perforations in the mica, should also be protected against occasional insertion of excessively thick or double micas which might wreck the die. The gauging mechanism achieves these results.

Reference will now be made to the details of the mica-piercing mechanism 120 illustrated best in FIGS. 11, 12, 17 and 18. The upper piercing die 120a is carried by a head 120f which is positively reciprocated through a fixed stroke by a lever 120g, link 120h, and a crank 120i on shaft 114. Downward pressure is transmitted to shafts 120e of the pressure pad and stripper plate 120c by spring 120j, upright shaft 120m and lever 120n. This lever is coupled to shaft 120m via bearing plates 120k. To lower the pressure pad and stripper plate lever 120n is rocked by link 120p connected via the cam following lever 120q to cam 120 r on shaft 114. The stripper plate and pressure pad 120c are raised with the carrying head 120f by virtue of block 120s (FIG. 18). This overcomes the tendency of spring 120j to hold the pressure pad downward continuously.

As stated earlier, the pressure pad 120c forces each bottom mica into a tight fit in the seat or hole 124a of transfer blade 124. This blade fits into a recess directly below and in engagement with the lower face of indexing feed turret 112, and serves to remove the pierced micas and hold same in accurate orientation for assembly to the accurately located ends of the long stem wires. The operating mechanism for the transfer blade 124 is shown in detail in FIGS. 11, 12 and particularly in FIG. 16. From FIGS. 20, 21 and 22 it will be clear that the transfer blade 124 slides horizontally to clear die 120b and swings upward from the horizontal mica-receiving position to a vertical mica-applying position (FIG. 20); and then it advances frontally through a forward thrust stroke toward the stem in stem block 10.

Transfer blade 124 is pivotally mounted in a bearing 124b (FIG. 16) which is carried on shaft 124c so as to be horizontally reciprocable toward and from the stem block 10 (shown in broken lines at the bottom of FIG. 11). Shaft 124c is prevented from rocking by being fixed to block 124d, in turn fixed to shaft 124e, both the shaft 124c and the shaft 124e moving in slide bearings 110a in table structure 110. The transfer blade 124 and its bearing 124b are reciprocated horizontally by a drive linkage pivotally connected to block 124d and including a resiliently telescopic link 124f connected to cam-following lever 124g engaging positive, constrained cam 124h on shaft 114. The forward stroke of shaft 124c carries the transfer blade 124 away from the piercing die and toward the stem block 10, the stroke toward block 10 being mechanically limited by a suitable stop at an accurately determined end point.

The transfer blade 124 is actually thrust along a straight line path toward the stem block 10 after being swung through 90° from the horizontal position shown in FIG. 16 to a vertical position. This swinging motion is effected by a crank lever 124i having an anti-friction roller in a channeled member 124j on the vertically slidable shaft 124k. This shaft is urged downward in order to swing the transfer blade 124 into vertical position, the end point of this clockwise swing (FIG. 16) being determined by head 124m engaging frame 116. The head 124m is normally made adjustable by details not shown. The shaft 124k is reciprocated vertically through a telescopic longitudinally yielding link 124n, cam following lever 124p, and positive, constrained cam 124r on shaft 114.

When cam 124r biases the channel member 124j downward to an accurately fixed extent determined by the adjusted position of head 124m, the bearing 124b carries the transfer blade 124 horizontally forward by virtue of the cam operated linkage driven by cam 124h. During much of this horizontal travel or thrust, the transfer blade 124 is maintained in the vertical position accurately by virtue of the engagement of crank 124i in channel 124j, and by engagement of head 124m with frame 116.

The transfer blade 124 thus receives and tightly encircles a mica pierced with the holes in accurately predetermined relationship and carries the mica toward the stem block 10 for application to the long wires 6 and 7, wires that serve as reference wires in subsequent operations.

In FIGS. 15 and 20, the pushing mechanism 126 is shown. This also serves as a further check on the presence of a bottom mica. It is seen to include a pair of supporting shafts 126a and 126b slidable in a fixed portion 110c of the machine. Through links 126c, pivoted bell crank 126d, and positive, constrained cam 126e on shaft 114, the detecting and pushing head 126 is horizontally reciprocated. The bell crank 126d is supported on a long shaft 126f operable in fixed bearings 126g (FIG. 11).

The transfer blade 124 is swung from below feed plate or turret 112 along its horizontal travel, as indicated in FIG. 18, and is swung through 90°. Finally the blade 124 is thrust toward stem block 10 through a predetermined forward stroke, as indicated in FIG. 21. The 90° swing brings the supported pierced bottom mica into position between the stem block 10, and pusher unit and detecting head 126. Both the transfer blade 124 carrying the bottom mica and head 126 approach the stem block 10 together, as seen in the timing diagram of FIG. 105. Head 126 gains on the transfer blade 124, until finally, after the transfer blade is arrested as shown in FIGS. 21 and 22, the head 126 presses bottom mica onto reference wires 6 and 7.

The tools for taking hold of reference wires 6 and 7 and precisely locating the free ends thereof include a first pair of laterally movable gathering jaws 128a, 128b, best shown in FIGS. 20, 20A and 21A. One of the gathering tools, tool 128b, is formed with V-shaped notches 128c as shown in FIGS. 20A and 21A. Tool 128b also has a vertical groove 128d complementary to and receiving a rib 128a' on the gathering tool 128a. These two jaws or gathering tools 128a and 128b, which may be designated as a pair by numeral 128, laterally engage and accurately locate the reference wires 6 and 7 in relation to the holes in the mica carried by the transfer blade 124. However, the precision that may be realized in this fashion is not always adequate, especially in the case of extremely small parts, fine wires, and close tolerances. For this reason an additional pair of locating gathering tools or jaws 130 are here provided. These tools are seen in FIG. 21A, to be closed against each other and forming aligning holes (FIG. 20A) receiving the ends of the reference wires 6 and 7. They might be formed as a single die, like the cutting die at station B, except that here the die must be split when the stem is to be freed after the mica has been applied. The aligning holes 130a have flared mouths 130b opening toward the wires 6 and 7 of the stem to facilitate threading onto wires 6 and 7 during the advance of jaws 130 as a unit toward the stem block 10. Thereafter the transfer blade 124, by virtue of its tight fit against the peripheral edge of bottom mica, is effective to force that bottom mica onto the uncut reference wires 6 and 7. Jaws 130 then separate, enabling head 126 to push the bottom mica further along wires 6 and 7.

The mechanisms for operating the gathering and combing tools or jaws 128, 130 are shown in FIGS. 11, 12 and 14. The main drive shaft 114a rotates continuously, and through gearing drives the cam shaft 114 and also drives the intermediate shaft 114b through other gearing. The latter shaft, through one-to-one gearing and chain 114c drives another shaft 114d which in turn imparts motion to cam shaft 114e.

The gathering tools 128, 130 are mounted on a fore-and-aft slidable carriage 132 fixed to sliding rods 132a and 132b in bearing 132e. These shafts are reciprocated through the required stroke by a suitable linkage including cam follower 132c, and positive, constrained cam 132d. The fore-and-aft sliding of the jaw assembly on shaft 114e is effective to pick up and comb wires 6 and 7 for preliminary positioning, and to thread the ends of stem wires 6 and 7 through the aligning holes 130a in the jaws 130.

In FIG. 14, the preliminary gathering tools or jaws 128a and 128b are seen to be freely pivoted on shafts 132a. The jaw 128b has a downward extension 128e engaging stops to fix the end point of its travel in transversely approaching wires 6 and 7 of the stem. Segmental gearing 128f interconnects jaws 128a and 128b to operate as a pair. The depending arm 128g is operated by link 128h, a lever-support cam follower 128i, and a cam 128j on shaft 114d.

Fine combing jaws 130 have similar interconnecting gearing and a mechanical stop 130c coacting with depending arm 130d to control the centering of the jaws 130 and to pivot the jaws as a pair to and from each other. Jaws 130 are operated by link 130e connected to a cam following lever 130f driven by cam 130g on shaft 114b, lever 130f being spring-biased against that cam.

The timing of all the tools of this station as already described is illustrated in self-explanatory FIG. 35.

The pusher unit 126 carries a spring-biased insulated contact 126h which is connected to a detecting circuit (not shown) for completing a control circuit through 128 in the event that a bottom mica is lacking in any assembling operation. If no bottom mica is present, this electric circuit is effective to disable succeeding operation stations to avoid wasting of parts on a stem which does not have a bottom mica. However, the machine as a whole is arranged to continue to operate despite the lack of a bottom mica at this phase of the operation. For a suitable control circuit for this purpose, see my copending application Serial Number 790,570, filed December 9, 1947.

It has been noted that FIG. 35, the timing diagram of this station D, is largely self-explanatory. This is true of the curve of operations effected by cam 112e for indexing mica feed plate; by eccentric 120i for the piercing die; by cam 120r for the stripper 120; and by 118g for the mica-gaging feeler. These operations take place during, and shortly after, the indexing of the main stem-block conveyor, in providing transfer blade 124 for application to the stem newly delivered to this station.

Cam 132d starts to carry the subcarriage 132, with tools 128 and 130 toward the stem block when arrested in station D. Tools 130 close to form passages having flared openings facing the stem block, approaching the ends of the #6 and #7 stem wires. Tools 128 advance separated, until they can embrace the long stem wires, whereupon they close and receive those stem wires, to slide along the wires when subcarriage moves further toward the stem block and when wires #6 and #7 penetrate tool passages 130a.

Cam 124h carries transfer blade 124 forward out of under mica feed plate 112 during the foregoing operations of gathering tools 128 and 130; and after cam 124r swings blade 124 into vertical position, cam 124h advances the upright blade 124 frontally toward the stem block 10. In the final part of its stroke, blade 124 carries its mica forward to be penetrated by the short projecting #6 and #7 wires accurately held by tools 130.

Meanwhile, cam 126e drives pusher 126 forward, and pushes the mica out of blade 124 and along the stem wires, tools 130 having been separated at this time by cam 130g. The jaws 128 separate at this time, so that cam 132d can effect withdrawal of both tool pairs 128 and 130 without disturbing the bottom mica. Transfer blade 124 and pusher 126 are suitably withdrawn, the latter first, to be in position for the next cycle when the stem with the bottom mica is advanced to the next station and the next stem is advanced into station D.

*Short lead bending mechanism*

Adjacent the bottom mica mechanism just described it is convenient to include a further useful tool. It sometimes happens that the short wires are disposed in convenient positions in stations B and C, near but not in required position. They are here bent again so that the side rods of the grids that are later to be assembled will not butt against the ends of the short wires.

In FIGS. 22A, 22B, 22C there are shown clearance-providing tools which are effective to position the short-length wires 2, 8 and 9 for unimpeded assembly of the grids $g1$, $g2$ in following stations. As seen in FIG. 22C, which is a view looking toward the mount showing the wire orientation and the position of the grids $g1$, $g2$ to be assembled (illustrated by the dot-dash lines), there is a possibility that short length wires 2, 8 and 9 defining the abutment for the bottom mica $bm$ may interfere with the grid side rods to be projected through the bottom mica. These wires should be close to the side rods of the grids, since the wires are ultimately to be welded to the side rods for terminal leads for those electrodes. However, they may occasionally interfere with the mechanical assembly, a difficulty cured by the mechanism here being considered.

A pair of clearance tools 127a, 127b are mounted for swinging movement into the operative positions of FIG. 22C wherein the curved convergent edges of the respective tools function to accurately orient the short length wires 2, 8 and 9. The clearance tools 127a, 127b are mounted on heads 127c, 127d fixed to pivoted supports 127e, 127f. Though not shown in detail, the mounting of the respective tools on the heads 127c, 127d is such as to permit the tools to be locked in various adjusted positions relative to the stem in stem block 10. The supports 127e, 127f are pivoted at 127g, 127h and are biased toward an interposed fixed stop (not shown) by appropriate springs 127j, 127k. The springs 127j, 127k act on the chains 127l, 127m trained over the sprockets 127n, 127o for the respective shafts 127g, 127h to bias the supports 127e, 127f toward the limiting position determined by a stop, as illustrated in FIG. 22B. The tools 127a, 127b are periodically retracted from the operative position illustrated in FIGS. 22B, 22C by means of the cam following levers 127p, 127q, connected to the chains, respectively, and riding on controlling cams 127r, 127s on the shaft 20. Accordingly, while a bottom mica $bm$ is being assembled in the station D, the tools 127a, 127b are effective to properly adjust the short length wires 2, 8 and 9 to positions of clearance for subsequent operations, particularly for the assembly of the grids $g1$ and $g2$.

Referring to FIG. 1B, station E is shown as adding the No. 1 grid to the bottom mica *bm* previously assembled to the stem or incomplete mount. Not only is the grid *g1* assembled to the mica, but also a short strap or grid stop *gs* is secured to a grid side rod. This stop is tight against the back or under face of the bottom mica, which mica is confined between this grid stop on one surface and the last helical turn wound around and secured to the grid side rods. These grid rods project through holes pierced in the bottom mica.

In order to add the grid stop *gs* to the side rods, the grid stop is welded in place to one of the side rods after both of the side rods have penetrated appropriate holes in the bottom mica *bm*. By pushing the mica to an intermediate position in station D, only part way along the stem wires 6 and 7, space is provided in station E for the tools that assemble and weld the grid stop to the grid side rod. A substantial distance is allowed between the intermediate position of the bottom mica *bm* and the projecting ends of wires 1, 3, 4 and 5, and a still greater distance is allowed between the bottom mica *bm* and the free ends of the shortest leads 2, 8 and 9. The swaged portions of the intermediate leads 1 and 4 and the short leads 2, 8 and 9 define a datum plane where the bottom mica *bm* is seated ultimately.

From the following discussion of the No. 1 grid station E, various principles will be recognized as having application here which were previously described in connection with preceding stations. It is clear that every effort is made to locate the stem block 10 accurately in each work station. However, because of various dimensional tolerances and imperfections in adjustment of the stem block 10 in relation to the tools in the station, and further where very fine, tightly fitting parts are used, something additional is desirable for assuring routine success. Tools in this station take hold of certain wires projecting from the stem, similar to combing tools in work stations B, C, and D where cutting, swaging, and mica-loading were involved and where the work to be processed is "picked up" and oriented in respect to the working tools at each station. Additionally, the orienting operation effected by sliding the tools along the stem wires is an operation common to various stations. This operation might be termed "combing" in contrast to operation of the V-notched tools, which, in gripping, merely gather the gripped leads.

Devices of station E deal with individually supplying grids to a grid inserter and with preparing and precisely positioning a grid stop that is to be applied to a side rod of a grid projecting through a mica. There remains to be explained the manner of directing the grid side rods toward the holes provided for them in the mica. This is achieved by a series of operations, in which the mica is shifted transversely and rotationally in any degree required, by picking up the long #6 and #7 wires that carry the mica, and fixing a pattern for the grid side rods and the #6 and #7 wires that matches the pattern of holes in the mica. While it is the mica whose location is critical, the mica is indirectly controlled, by handling the long wires penetrating the mica. The tools that achieve the double results of picking up the #6 and #7 wires (and with them, the mica) and establishing a pattern for the side rods and the long stem wires matching the mica perforations have passages with reverse flares directed respectively toward and away from the stem block, that is, toward the ends of the long stem wires and the grid rods, respectively, with the tools interposed between those parts. These tools operate to gather the several wires, and in their travel along the stem wires, act in a broad sense as combining the gathering tools. The remarkable effectiveness of the whole operation will be appreciated from a realization of the extreme precision required by the small dimensions of the parts. The wires and the side rods might buckle, and the ¼ inch diameter mica might be damaged, if the pattern of the wires and rods as well as the pattern and orientation of the mica holes in relation to the wires are not correct within a thousandth of an inch, recalling that the side rods have a tight fit in their holes through the mica.

The gathering tools for the stem wires and the grid side rods include a pair of jaws which have a complex motion for their multiple functions. These jaws close on each other and advance toward the stem to receive and "take in hand" the uncut reference wires 6 and 7 projecting from the stem. In the closed position, the jaws form a two-part guide passage through which the grid inserter thrusts the grid toward the bottom mica *bm*. The jaws may also serve to press the bottom mica toward the welding tools. After a No. 1 grid has been inserted into a bottom mica of a mount M, the jaws withdraw.

The stem arrives at station F bearing the bottom mica supported near the free ends of wires 6 and 7, the mica in turn carrying the #1 grid with its grid stop welded in place. At the #2 grid station, the second and last electrode is assembled, that is to have portions extending through the bottom mica. Subsequently the four medium-length leads 1, 3, 4 and 5 of the stem extend through this mica, but of the electrodes added to the stem, the #2 grid is the last to have parts pushed through the bottom mica. In this station F, the mica is "backed up," as was also the case in station E, while spaced away from stem leads 1, 3, 4 and 5; and after the side rods of grid *g2* are driven through the bottom mica, that mica and the electrodes carried thereby are shifted along long wires 6 and 7 into their final positions. Bottom mica *bm* then rests against the ends of short stem wires 2, 8 and 9 and against the shoulders swaged at the same plane on wires 1 and 4; and the medium length leads 1, 3, 4 and 5 extend through the bottom mica. This result follows not solely from the transport of the bottom mica, but from the combined combing and pattern-adjusting operations effected in stations B and C, and the related pattern of holes pierced through the bottom mica in station D.

The mechanisms for inserting the #2 grid, is seen in FIG. 1B at station F. This station uses certain principles and certain mechanisms covered in my previously filed application Serial No. 790,570, filed December 9, 1947. This station utilizes duplicated or essentially duplicated mechanism as those used for the No. 1 grid station E. It is the function of the combing tools similar to tools in stations B and C, to align the various medium-length wires with the utmost precision. These leads enter the pattern of holes in the bottom mica *bm* as other tools drive the mica toward the glass button of the stem until the bottom mica *bm* is properly seated in the datum plane of the shoulders S and short wires 2, 8 and 9.

It is necessary in the course of the operation of assembling the #2 grid to carefully adjust the position of the #1 grid and the uncut reference wires 6 and 7 previously on the stem in order that the parts may not be deformed.

Stem wire gathering tools engage the intermediate length stem leads. These tools are effective to close in upon and accurately locate six of the nine wires projecting from the mount M at the #2 grid station F. The other three wires, namely 2, 8 and 9 were previously shortened in the lead trimming station B. In addition, the gathering tools are formed with a through passage for receiving the #1 grid *g1* and the grid stop *gs* secured to one side rod of the #1 grid *g1* after the gathering tools have been brought forward along the uncut reference wires 6 and 7.

In FIG. 1B opposite station F, the mount is shown complete to the extent of having the bottom mica *bm* and the first two grids *g1*, *g2*. In this condition, the conveyer 12 advances the stem block 10 carrying such incomplete mount around sprocket 16 to stations G and H where two halves *a* of a two-part anode are applied in succession to respective pairs of wires 3, 4 and 1, 5 that project through the bottom mica. By means of an automatic feeder and appropriate welding mechanism, not shown, a getter is spot-welded to the anode part *a* shown at the top of the mount at station G. In this condition the anode half *a* is ready for assembly to the stem by a mechanism which is substantially duplicated at station H for applying the second anode part *a* to the stem.

Mechanisms are provided for assembling one part of the two-part anode to the mount after it emerges from the second grid-assembly station F and enters anode assembling station G. The other anode assembling station H is similar in all respects except that the anode part is applied in inverted condition, and the stem-and-anode-engaging tools are appropriately inverted.

*Top mica applying station I*

Referring now to FIG. 1B, the mount is completed to the extent of having both the first and second grid *g1, g2*, as well as both parts *a* of the two-part anode when it arrives at station I. The grids are supported by their side rods which penetrate the bottom mica *bm* and the anode parts are supported by the medium-length wire pairs 1, 5 and 3, 4 which likewise penetrate the bottom mica. At station I, the top mica *tm* is to be pierced and then applied to the projecting side rods of the grids *g1, g2* and to the long stem wires 6 and 7 which extend from the glass header *h*. Many of the same principles and virtually the same mica handling mechanisms are used in station I for piercing the top mica *tm* and applying it to the wires projecting from the stem as disclosed in connection with station D in FIGS. 11, 22 for forming and applying the bottom mica *bm* to the same wires. In station I, however, the top mica is also to be applied to the grids, penetrated by the grid side rods. The top mica is pierced in station I; the ends of wires #6 and #7 and of the grid side rods are adjusted into the pattern corresponding to the pierced holes; and finally the top mica is applied to those wires and rods. The anode parts *a* do not penetrate the top mica, but serve as the limiting reference plane to which the top mica is pushed when it is applied.

Because of the great similarity between the mechanisms in stations D and I and in the interest of conciseness, the illustrated mechanisms of the bottom mica station D are not shown and described in connection with top mica station I, but, instead, only those portions are shown whose coaction with different structures in station I deserves comment; and such portions of station D that are duplicated in the views of station I are designated by corresponding primed numerals.

The work performed at the top mica-applying station I is illustrated in FIG. 27 which is a plan view of the stem block 10 at station I, carrying the incomplete mount M with uncut reference wires 6 and 7 and the side rods *r* of the No. 1 and No. 2 grids *g1, g2* projecting beyond the ends of the anode parts *a*. A transfer blade 124' carries the top mica *tm* which is tightly fitted in a hole therein and is disposed vertically in front of the pusher 126' for ultimately driving the top mica *tm* into position. The front end surface of pusher unit 126' is formed with two holes having chamfered recesses or flared mouths to receive long wires 6 and 7, and with a transverse slot to receive the for grid side rods as the top mica *tm* is driven against the ends of the two anode parts *a*. The pusher unit 126' and the transfer blade 124' are both advanced toward the mount carried by the stem block 10 at an appropriate time in the cycle, by mechanism detailed in station D. At this time, tools at station I have prefectly oriented the ends of the wires and of the side rods which are to be received and forced through a corresponding pattern of holes pierced in the top mica *tm*.

As seen in FIGS. 24, 25, 27, 28 and 31, two sets of combing and gathering jaws 176 and 178 are used which are operative both to advance toward the stem block, and each pair closes on the work. The jaws 176 (FIG. 24) are effective to close in on the longest stem wires 6 and 7 and to hold them until the top mica *tm* has been pushed by the transfer blade 124' onto the ends of those wires. The transfer blade 124' thereafter stops moving toward the stem bloc 10 while the pusher unit 126' is projected through the blade 124' and thereby pushes the mica toward the stem block along wires #6 and #7.

As soon as the top mica *tm* has been applied to stem wires 6 and 7 by blade 124', jaws 176 are quickly retracted. The top mica *tm* is carried forward along wires #6 and #7 by pusher 126'. The pattern of holes in the top mica is accurately oriented as a result of being pierced while being tightly received in member 124'; and this orientation is preserved after the top mica is pushed out of blade 124', by engagement of holes 126" in pusher 126' with the stem wires #6 and #7 that pentrate the pierced mica. At this stage, gathering tools 178 have closed in on the grid side rods (FIG. 31) to adjust them into alignment with the holes in the advancing top mica. This mica is guided by wires #6 and #7 in pusher holes 126" approaching the ends of the grid side rods *r* despite release of the top mica by blade 124' and despite release of wires #6 and #7 by tools 176.

After the mica has been advanced by pusher 126' onto the ends of the grid side rods (FIG. 29) the tools 178 spread and clear a path for the pusher to advance the mica against the ends of anode parts *a* (FIG. 30). Thereafter, the two sets of open tools 176 and 178 are retracted from the stem block, as are blade 124' and pusher 126'. This clears the path for the conveyor to carry the next stem into mica-receiving position, and for the next top mica to be pushed into blade 124' and pierced in readiness for the next cycle.

The detailed nature of the two sets of gathering tools 176 is best illustrated in FIG. 24, where these gathering tools are shown in full engagement with stem wires 6 and 7 or "closed." The same tools are shown "open" or separated in FIG. 25 where tools 178 are also shown "open." The jaw 176*a* is thinned or relieved at region 176*aa* so as to receive thin blade section 176*ba* of jaw 176*b*. Similarly, the thin projecting wedge 176*bb* is received in a channel 176*ab*, and the thin blade section 176*bc* is received within the relieved region 176*ac*. The jaws 176*a* and 176*b* close on each other, as shown in FIGS. 24 and 28 at a point beyond the free ends of the grid side rods. Accordingly, only the long reference wires #6 and #7 are engaged by the gathering tools 176*a* and 176*b*. In the event that either reference wire 6 or 7 is closer to the center axis of the stem than it should be, the projecting wedge 176*bb* moves it to its proper position, while the divergent surfaces 176*ad* move stem wires #6 and #7 (or either of them) toward the center if they should be displaced from their required critical positions.

The gathering tools 178*a* and 178*b* as illustrated in FIGS. 25 and 31 include sections 178*aa* and 178*ba* which slide across each other and overlap when the jaws are closed. These jaws or gathering tools have divergent surfaces 178*ab* and 178*bb* which, when the two jaws approach each other, engage the end portions of the grid side rods and thereby move the outer gride *g2* toward the properly centered position, considering the possible right-and-left misalignment. These jaws have recesses 178*ac* and 178*bc* for receiving the long wires 6 and 7 which were orientated by the jaws 176*a*, 176*b* and later by holes 126" in pusher 126'. The jaw 178*a* has an outer pair of divergent-sided notches 178*ad* and an inner pair of divergent-sided notches 178*ae*. The first pair of notches 178*ad* receive the No. 2 grid side rods and the second pair of notches 178*ae* receive the No. 1 grid side rods.

It is notable that the divergent surfaces 178*ab* and 178*bb* extend far forward of the projections 178*af* between recesses 178*ad* and 178*ae*, and that the divergent surfaces 178*af* slant outwardly and gradually to positions very close to the adjacent steep inner sides of recesses 178*ad*. In other words, the leading ends of projections 178*af* have a prominent outward slant.

This form of gathering tool is quite important, for in the event that both the No. 1 and the No. 2 grids are badly off-side, the No. 2 grid in being centered, actually engages and carries with it the No. 1 grid. When the No. 2 grid has reached the narrow recesses 178ad, the prominently slanting tooth portions 178af leading into recesses 178ae in gathering tool 178a pick up the No. 1 grid side rods. This occurs at a time later than the adjustment of the No. 2 grid side rods, and carries the No. 1 grid out of contact with the No. 2 grid and centers the No. 1 grid. This is effected during the final stroke of jaw 178b toward jaw 178a.

Jaw 178b has nearly flat surfaces 178d across which the grid side rods can slide as they are shifted by the slant surfaces in gathering tool 178a. Surfaces 178d may be somewhat stepped (as shown) to take into account the difference in diameters of the side rods of the two grids, the side rods of the No. 1 grid being thinner. The final closed configuration of the gathering tools 178 is illustrated in FIG. 31, where the grid rods are shown seized and located with great precision for penetrating the holes provided in the top mica tm.

The mechanisms for operating jaw sets 176 and 178 are illustrated in FIGS. 23, 26 and 32, now to be described. As previously remarked, the mechanism for operating the pusher unit 126' and transfer blade 124' are amply described in connection with the bottom mica station D shown in FIGS. 11 to 22 inclusive.

In FIG. 23 there is shown the pusher unit 126' in position to be advanced along the thrust path toward the stem block 10 (shown in broken lines) that has been advanced into this station by the conveyor 12. Blade 124' is omitted for clarity. The same mechanism appears in elevation in FIG. 26, pusher 126' being omitted, and both sets of jaws 176 and 178 being shown in closed configuration comparable to FIG. 28. Jaws 176 are carried on pivots 176c and 176d projecting from arm 176e that extends to the right in FIGS. 23 and 26 from a sliding carriage 176f.

The nature of the sliding carriage 176f is perhaps better illustrated in FIG. 32 where this carriage is seen to be slidably mounted on shaft 176g fixed to standard 176h carried by a fixed bed plate 176i. Guide rail 176i' (FIG. 26) on standard 176h constrains carriage 176f so as to insure straight-line fore-and-aft travel, guarded against pivoting about shaft 176g. By virtue of the foregoing, the jaw set 176 is movable toward and away from stem block 10. The carriage 176f is reciprocated by link 176j pinned to cam-following lever 176k that is operated by constrained cam 176m. Incidentally, jaws 178, pivoted on standard 178c are also carried fore-and-aft by reciprocable carriage 176f just described.

Returning now to the set of jaws 176, it is observed that supporting arm 176e has an upward extension 176p which has a forward projection 176q extending between the arms of jaws 176. This projection 176q constitutes an abutment against which adjustment screws 176r and 176s are arrested, limiting the rocking motion of jaws 176 to accurately establish the ultimate side-to-side positions for the pair of stem wires #6 and #7 as located by jaws 176a and 176b.

The jaws 176 have depending arms 176t and 176u connected by links 176w and 176x to cam-following levers 176y and 176z. These cam-following levers are operated by cams 177a and 177b on shaft 177c, and are biased against these cams toward jaw closing position by a common spring 177d connected between arm 176u and cam-follower 176z. Cam shaft 177c is coupled by bevel gearing 177e to the shaft 177f that drives cam 176m. The cam shaft 177c is driven by main drive shaft 177h of the top mica unit I through one-to-one gearing 177g–177i. This main drive shaft is coupled, advantageously through a single-revolution electrically disabled clutch connected to the main drive shaft 20 of the machine. Shaft 177h also operates pusher 126', blade 124' and all the other mechanism (not shown) forming part of the top mica unit in station I.

Referring now to FIG. 26, jaws 178 are pivoted at 178d and 178e. An adjustable stop and centering arrangement comparable to 176q–r–s is provided at 178f, the detail of which need not be repeated since a complete understanding may be obtained from the previous description. Rearwardly extending arms 178h and 178i on jaws 178 are oscillated by links 178j and 178k respectively connected to cam-following levers 178m and 178n, which are driven by cams 178p and 178q, respectively, on shaft 177f. The jaws are biased to move toward each other by spring 178r connected respectively to cam-following lever 178m and to rearwardly extending arm 178i, as illustrated best in FIGS. 26 and 32.

The operation of so much of the top mica station I as is represented in FIGS. 23, 26 and 32 will be evident from the foregoing description of the operations performed at this station, and from the linkages described. By virtue of positive constrained cam 176m, carriage 176f is oscillated fore-and-aft and carries both sets of jaws 176 and 178 fore-and-aft as a unit, to and from the stem block 10 as required during the operating sequence illustrated in FIGS. 27 to 30 inclusive. Both jaw sets are spring biased toward each other and have centering stops which determine their final closed positions. Separate cams are provided for operating each of these jaw sets in the direction away from the stem block axis.

In FIG. 36 the timing of the various mechanisms are illustrated, with curves bearing the same numerals as the cams that produce the several operations. There it is seen that blade 124' is operated by cam 124h' to have its final forward motion toward the stem block at about the 270° part of the machine cycle, after cams 177a and 177b have closed jaws 176 on stem wires #6 and #7 and after cams 177a and 177b have closed jaws 178 on the grid side rods (the latter operating shortly after the former). This advances the mica tm on wires #6 and #7. Thereafter cams 177a, b open jaws 176 and cam 126e' advances pusher 126' toward the grid side rods, this occurring near the 280°–290° part of the cycle. Cams 178p, q then open jaws 178, and pusher cam 126e' is effective to drive the top mica along the grid side rods and against the end edges of anode parts a as previously described.

Cam 176m shifts the two sets of gathering tools 176, 178 toward the stem block as a unit, these tools being open, and advancing about the stem. The jaws close part way before the final advancing stroke of the jaw carriage which occurs approximately at the 210° part of the cycle; and after the final advance motion of the carriage the jaws close on the stem wires and grid side rods. After the mica applying operations are completed as described in the preceding paragraph, cam 176m is effective to retract the open pairs of jaws 176, 178 to clear the path for the stem with its top mica to leave and for the next stem to arrive. The various timing curves in FIG. 36 not specifically described represent the coordination of mechanisms not shown but present in this station as at station D.

Referring now to FIG. 1A, it is seen that the stem arrives in station J bearing the bottom mica, the No. 1 and 2 grids, the two parts of the anode, and the top mica. The mount M is almost fully assembled except that the upper ends of the anode parts a against the top mica tm are not rigidly held in position and are not interconnected as a single bi-part anode. The lower ends of anode parts are only frictionally held in position adjacent to the bottom mica bm by the intermediate-length wires 1, 3, 4 and 5. The top mica is only held frictionally on the side rods of the grids and on the long wires 6 and 7.

At station J, a connector c is inserted through the top mica tm and into the tubular passages at one end of each anode part or plate to provide the required mechanical and electrical interconnection. This connector c is a bridging wire or "hairpin" which fixes the anode parts accurately at the positions where the connector c penetrates the accurately pierced top mica. This connector serves the further purpose of holding the top mica tm against the ends of the anode plates and in position to maintain the accurate configuration of the electrodes. Additionally at station J the anode is welded to one or more of the medium-length stem wires and to the inserted "hairpin" for uniting the assembly permanently, and for forming the desired electrical joints. At station K, a second connector $c$ is inserted, being a mirror-image duplicate of the bridging connector at station J, and like welds are made.

The mechanism which inserts the connector $c$ is also designed to form the connector, this feature being important in that it eliminates the potentially severe problem of orienting and handling these tiny odd-shaped parts. (The connectors might otherwise be furnished as finished parts.) The connector material is supplied to the machine as a continuous wire which is formed into the required part and, while the newly-formed part is continuously gripped and is held in the desired orientation, this part is applied to the mount in the required position. A similar concept is involved in the No. 1 grid station wherein each grid stop is formed in the machine as needed and is at all times held until it is assembled in place on the stem.

At this station, the connector $c$ is formed and forced through the holes in the top mica pierced in accurate positions, with the intermediate, offset connecting bight pressed against the top mica $tm$ and with the legs driven into respective sleeves of the two anode parts. Accordingly, the ends of the anode parts nearest the top mica $tm$ are fixed in accurate spaced positions relative to the other electrodes previously mounted between the anode parts, fixed in proper precise positions by projections through the top mica.

In addition to the forming and assembling of connector $c$ in place as shown, the legs of the connector $c$ are spot welded to the anode parts at points $a'$, and stem wires 1 and 4 are spot welded to parts $a$ at adjacent points. This series of welding operations as described is susceptible to modification, since the anode-to-stem-wire welds may alternatively be accomplished in the anode assembly stations; and certain welding operations may be deferred until after the assembled mount M has been delivered from the machine, welded in the machine at only the few spots that will reliably unite the mount mechanically. It may be desirable to reduce the number of welds effected in the assembling apparatus because wear of the welding electrodes requires more frequent shut-downs for adjustment when a large number of welds is to be made than for few welds.

An important aspect of this station, similarly found in the No. 1 grid station, is the manner of orienting the top mica for receiving the legs of the anode connector $c$, this orientation being accomplished by tools that act by camming long stem wires 6 and 7 into place which carry the top mica into the precise required location and with its holes in the critical required positions.

When the stem block reaches station L, the mount is complete, very nearly in the form delivered by the assembling machine. It is a rigid unit, with the electrodes, the micas and the stem accurately and permanently united. Several operations must still be done before this mount can be enclosed in its envelope, namely the grids are to be joined to stem wires and a cathode is to be inserted and connected in place. With other forms of electrode and mounts, the concepts in the foregoing disclosure can readily be adapted to fabricate a technically complete mount. In the present machine, the long wires #6 and #7 are to be cut shorter, and the mount is to be withdrawn from the stem block. The stem wires #6 and #7 were deliberately made longer than required in the finished stem, for their functional contribution in the assembling process. In station L, a mechanical pair of cutters trims those wires, and a pair of jaws appropriately formed are provided to grip and withdraw the mount from stem block 10. As seen in FIGS. 1A, 2 and 5 one of the cam-operated stem block mechanisms 38, 40 previously described releases the mount for unloading. In the event of misoperation resulting in a mount remaining in a stem block after leaving station L, an operator can still clear the stem block during the next machine cycle and before the stem block enters the loading station A.

The mechanism of station L is not separately illustrated and described in detail because its nature will be clear from the foregoing description to those skilled in the art.

The various features of the invention are believed amply shown and described, to the extent that recapitulation might serve to confuse rather than to clarify. It should be noted that the total result of the operation of the properly adjusted apparatus is represented in the integral mount delivered which is of such excellence that rejection of a finished tube because of an electrode assembly defect is rare. This is a prominent advantage of the mechanically assembled mount over a manually assembled product.

The organized apparatus may be modified in innumerable respects. For example, the conveyor 12, while of unique construction adapted to the machine disclosed, might be dispensed with entirely in an evasive effort, and in its place manual attendants might physically move stem blocks 10 from each assembly unit to the next. Furthermore, in assembling like products of modified designs, portions of the assembling apparatus and method may be omitted or adapted to meet requirements. Consequently the appended claims should be broadly construed, consistent with the spirit and scope of the invention.

I claim:

1. In a mount machine including a stem block carrying a stem having wires to receive a mica, a mica-assembling station comprising a feed carrier formed with plural apertures each receiving a mica successively movable into a mica-piercing location, a transfer member formed with a supporting aperture arranged to receive and snugly engage a mica, die means at said location for forming successive micas with a prescribed pierced pattern and including a stripper for displacing successive micas from said feed carrier to said transfer member, gathering means engageable with said wires for locating the wires to correspond to the prescribed pierced pattern, operating means for moving said transfer member along a thrust path and through a predetermined stroke toward said stem block whereby the supported mica is applied to the wires of said stem, and pusher means operable in timed relation to said operating means for freeing the supported mica from said transfer member.

2. A mount machine according to claim 1, wherein said pusher means includes a finger effective to detect when the pierced mica is absent from said transfer member during movement through said predetermined stroke.

3. In a mount machine, comprising an intermittently indexed feed carrier formed with plural apertures each receiving a mica successively movable into a mica-piercing location, die means for piercing successive micas at said location and including a stripper for displacing successive micas from said feed carrier a transfer member formed with an aperture to receive and snugly surround a pierced mica in said mica-piercing location, and detecting means cooperable with an aperture in said feed carrier in advance of said mica-piercing location for detecting departure from a predetermined thickness of mica in such aperture.

4. In a mount machine including a stem block carrying a stem having wires for receiving a mica, a feed carrier formed with plural apertures each receiving a mica successively movable into a mica-piercing location, die means for piercing successive micas at said location and including a stripper for displacing successive micas from said feed carrier a transfer member formed with an aperture arranged to receive and snugly engage a pierced mica, means for mounting said transfer member for movement from a mica-receiving position confronting said feed carrier and along a frontal thrust path to a mica-engaging position relative to the wires of said stem, and means operable in timed relation to displacing and piercing of the mica for moving said transfer member from said mica-receiving position along said frontal thrust path to said mica-engaging position.

5. A mount machine including a stem block supporting an initially oriented stem having plural leads extending from a base in a random pattern and arranged in a first group of a short length to serve as a mechanical stop for a pierced bottom mica and a second group of leads of an intermediate length for penetrating said bottom mica, and a third group of long leads, a mica-assembling station including a first pair of gathering tools movable transversely of the stem axis and engageable about said long leads to define a preliminary guide pattern, a second pair of gathering tools spaced outwardly from said stem block and from said first pair of gathering tools and formed with lead-receiving bores in a final pattern registering with the pierced pattern of said bottom mica, means for moving said second pair of tools axially of said leads toward said stem block whereby the leads are brought into said final pattern, a transfer member supporting said pierced bottom mica, means for advancing said transfer member through a predetermined stroke over the patterned end of said leads and toward said stem block and means operable in timed relation to advancing of said transfer member and for spreading said first and second pair of tools from said lead-engaging position.

6. In a mount machine including a stem block carrying a stem having wires adapted to receive a mica, comprising a feed carrier formed with plural apertures each receiving a mica successively movable into a mica-piercing location, a transfer member located in said mica-piercing location and formed with a supporting aperture arranged to receive and snugly engage a mica, die means at said location for forming successive micas with a prescribed pierced pattern and including a stripper for displacing successive micas from said feed carrier to said transfer member, operating means for moving said transfer member along a thrust path and through a predetermined stroke toward said stem block and to apply the supported mica to the wires of said stem, gathering means along said thrust path for locating the wires to correspond to said prescribed pierced pattern prior to engagement of the mica with the wires of said stem, and pusher means operable in timed relation to said operating means for freeing the supported mica from said transfer member toward the end of said predetermined stroke.

7. In combination a male piercing die, and a female piercing die, means to carry a work piece between the male and female dies, and a transfer member embodying a ring between the dies and alignable with the work carrying means to receive work carried therein, said ring being dimensioned whereby the work is tightly confined in said ring during the piercing operation.

8. In an assembling machine, a holder for a stem having projecting wires, means gathering said projecting leads into respective predetermined positions in relation to said holder, a transfer member having a frame dimensioned to be tightly embraced about a mica to be assembled to said leads and operating means carrying said transfer member to the ends of said leads, and a pusher operable to shift said mica out of said transfer member and along wires previously brought into position by said gathering means.

9. The method of assembling mounts, which includes the steps of applying a mica to leads projecting from a stem with the mica at an intermediate position, assembling one or more electrodes with portions extending through the mica in such position, and advancing the mica with the assembled electrodes to a final position on the projecting wires of the stem.

10. A punching device comprising a feed carrier formed with plural apertures each adapted to receive a mica, means operatively connected to said feed carrier to intermittently index the same whereby successive micas are movable into a mica-piercing location, a transfer member formed with a seat dimensioned to receive and snugly engage a pierced mica, said transfer member normally being disposed below said feed carrier with its seat aligned with successive apertures of said feed carrier coming into said mica-piercing location, die means for piercing successive micas at said mica-piercing location and including a stripper for displacing successive pierced mica from said feed carrer to said transfer member, and means operatively connected to said die means for operating the same whereby successive micas are pierced at said mica-piercing location and displaced into said seat of said transfer member.

11. A punching device comprising a feed carrier formed with plural apertures each adapted to receive a mica, means operatively connected to said feed carrier to intermittently index the same whereby successive micas are movable into a mica-piercing location, a transfer member formed with a seat dimensioned to receive and snugly engage a pierced mica, said transfer member normally being disposed in confronting relation to said feed carrier with its seat aligned with successive apertures of said feed carrier coming into said mica-piercing location, die means for piercing successive micas at said mica-piercing location, said die means including cooperating die parts positioned one above and one below the aligned aperture and seat at said mica-piercing location, one of said die parts being movable through a piercing and transfer stroke, means for moving said one die part through said stroke, and a stripper on said one die part for displacing successive pierced mica from said feed carrier to said transfer member during said stroke.

12. In a mount machine including a stem block carrying a stem having wires adapted to receive a mica, a mica-piercing and assembling station comprising a feed carrier formed with plural apertures each adapted to receive a mica, means operatively connected to said feed carrier for indexing the same whereby the micas are movable in succession into a mica-piercing location, a transfer member formed with a supporting seat arranged to receive and snugly engage a pierced mica, said transfer member being normally disposed below said feed carrier with said supporting seat in position to be aligned with successive micas coming into said mica-piercing location, die means at said mica-piercing location for forming successive micas with a prescribed pierced pattern, said die means including cooperating male and female die parts positioned above and below said feed carrier and said transfer member, one of said parts being movable through a piercing stroke axially of the aligned aperture and supporting seat and carrying a stripper for displacing successive pierced mica from said feed carrier to said transfer member, actuating means operatively connected to said one part of said die means, operating means for moving said transfer member from beneath said feed carrier and along a thrust path through a predetermined stroke toward said stem block whereby the pierced mica supported by said transfer member is engaged about the wires of said stem, a pusher movable along said thrust path, and actuating means for said pusher operable in timed relation to said operating means for freeing the pierced mica from said transfer member toward the end of said predetermined stroke and when said pierced mica is supported on said wires of said stem.

13. In a mount machine including a stem block carrying a stem having wires adapted to receive a mica, a mica-piercing and assembling station comprising a feed carrier formed wtih plural apertures each adapted to receive a mica, means operatively connected to said feed carrier for indexing the same whereby the micas are movable in succession into a mica-piercing location, a transfer member formed with a supporting seat arranged to receive and snugly engage a pierced mica, said transfer member being normally disposed adjacent said feed carrier with said supporting seat in position to be aligned with successive micas coming into said mica-piercing location, die means at said mica-piercing location for forming successive micas iwth a prescribed pierced pattern, said die means including cooperating male and female die parts positioned above and below said feed carrier and said transfer member, one of said parts being movable through a piercing stroke axially of the aligned aperture and supporting seat and carrying a stripper for displacing successive pierced mica from said feed carrier to said transfer member, actuating means operatively connected to said one part of said die means, operating means for moving said transfer member from beneath said feed carrier and along a thrust path through a predetermined stroke toward said stem block whereby the pierced mica supported by said transfer member is engaged about the wires of said stem, guide means along said thrust path for locating the wires to correspond to said prescribed pierced pattern prior to engagement about the wires of said stem, a pusher movable along said thrust path, and actuating means for said pusher operable in timed relation to said operating means for freeing the pierced mica from said transfer member toward the end of said predetermined stroke and when said pierced mica is supported on said wires of said stem.

14. A mount machine including a stem block adapted to support an initially oriented stem having plural leads extending from a base in a random pattern, said leads being arranged in a first group of a short length adapted to serve as a mechanical stop for a pierced bottom mica and a second group of leads of an intermediate length adapted to penetrate said bottom mica, a mica-assembling station comprising a feed carrier formed with plural apertures each adapted to receive a mica, means for moving said feed carrier to bring successive micas into a mica-piercing location, a transfer member formed with a seat arranged to receive and snugly engage a pierced mica, means for mounting said transfer member for movement from a mica-receiving position confronting said feed carrier with said seat aligned with successive micas at said mica-piercing location to a mica-engaging position along the stem axis, die means for piercing successive micas at said mica-piercing location including a stripper for displacing successive pierced mica from said feed carrier to said transfer member, means operable in timed relation to piercing and displacing of the mica for moving said transfer member from said mica-receiving position to said mica-engaging position, a first pair of combing tools movable transversely of the stem axis and engageable about said leads to define a preliminary lead pattern, a second pair of combing tools spaced outwardly from said stem block and formed with lead-receiving bores in a final lead pattern registering with the pierced pattern of said mica, means for moving said second pair of tools axially of said leads and toward said stem block whereby said leads are brought into said final pattern, and means operable in timed relation to movement of said transfer member for retracting said first and second pair of tools from said lead-engaging position as said transfer member moves into said mica-engaging position.

15. A mount machine including a stem block adapted to support an initially oriented stem having plural leads extending from a base in a random pattern, said leads being arranged in a first group of a short length adapted to serve as a mechanical stop for a pierced bottom mica and a second group of leads of an intermediate length adapted to penetrate said bottom mica, a mica-assembling station comprising a feed carrier formed with plural apertures each adapted to receive a mica, means for moving said feed carrier to bring successive micas into a mica-piercing location, a transfer member formed with a seat arranged to receive and snugly engage a pierced mica, means for mounting said transfer member for movement from a mica-receiving position confronting said feed carrier with said seat aligned with successive micas at said mica-piercing location to a mica-engaging position along the stem axis, die means for piercing successive micas at said mica-piercing location including a stripper for displacing successive pierced mica from said feed carrier to said transfer member, means operable in timed relation to piercing and displacing of the mica for moving said transfer member from said mica-receiving position to said mica-engaging position, a first pair of combing tools movable transversely of the stem axis and engageable about said leads to define a preliminary lead pattern, a second pair of combing tools spaced outwardly from said stem block and formed with lead-receiving bores in a final lead pattern registering with the pierced pattern of said mica, means for moving said second pair of tools axially of said leads and toward said stem block whereby said leads are brought into said final pattern, means operable in timed relation to movement of said transfer member for retracting said first and second pair of tools from said lead-engaging position as said transfer member moves into said mica-engaging position, and means operable along said stem axis for disengaging said mica from said transfer member when the latter moves into said mica-engaging position with the mica received over the patterned leads.

16. In a sheet-assembling station, coacting male and female sheet-piercing dies, means to feed a preformed sheet into the space between said dies, an assembling blade effective to transfer said sheet to assembled position, said blade having an aperture tightly congruent about said sheet so as to prevent enlargement or fracturing thereof during piercing, and a stripper plate operable to force the sheet into the blade.

No references cited.

RICHARD H. EANES, Jr., *Primary Examiner.*